(12) United States Patent
Ciesielczyk et al.

(10) Patent No.: US 12,638,651 B2
(45) Date of Patent: May 26, 2026

(54) CABLE ENCLOSURE

(71) Applicant: Preformed Line Products Co.,
Mayfield Village, OH (US)

(72) Inventors: Benjamin Franklin Ciesielczyk,
Madison, OH (US); Jacob Palmer,
Chesterland, OH (US); Cameron
Clines, Chagrin Falls, OH (US)

(73) Assignee: Preformed Line Products Co.,
Mayfield Village, OH (US)

( * ) Notice: Subject to any disclaimer, the term of this
patent is extended or adjusted under 35
U.S.C. 154(b) by 274 days.

(21) Appl. No.: 18/590,273

(22) Filed: Feb. 28, 2024

(65) Prior Publication Data

US 2024/0288655 A1 Aug. 29, 2024

Related U.S. Application Data

(60) Provisional application No. 63/448,891, filed on Feb.
28, 2023.

(51) Int. Cl.
G02B 6/50 (2006.01)
H02G 9/06 (2006.01)
(52) U.S. Cl.
CPC .............. G02B 6/501 (2023.05); H02G 9/06
(2013.01)

(58) Field of Classification Search
CPC .................................. G02B 6/501; H02G 9/06
See application file for complete search history.

(56) References Cited

U.S. PATENT DOCUMENTS

| | | | | |
|---|---|---|---|---|
| 5,774,618 A | * | 6/1998 | Jones | G02B 6/4442 |
| | | | | 385/134 |
| 2004/0156611 A1 | * | 8/2004 | Cloud | G02B 6/4444 |
| | | | | 385/135 |
| 2004/0256138 A1 | * | 12/2004 | Grubish | G02B 6/44528 |
| | | | | 174/93 |

* cited by examiner

*Primary Examiner* — Sherman Ng
(74) *Attorney, Agent, or Firm* — Cooper Legal Group,
LLC

(57) ABSTRACT

A cable enclosure includes a housing defining an opening
through which an interior of the housing is accessible. The
cable enclosure also includes an end plate assembly that,
when attached to the housing, covers the opening such that
the interior of the housing is not accessible. The cable
enclosure further includes a mechanism attached to at least
one of the housing or the end plate assembly and that
selectively attaches the end plate assembly to the housing.
When the mechanism in a first position, the end plate
assembly is attached to the housing and when the mecha-
nism is in a second position, the end plate assembly is not
attached to the housing.

21 Claims, 29 Drawing Sheets

Bump Outs for Cam retention

Retention Tabs

Cam Lever Retention Finger

Side View - Installed

Front View - Installed

Cam Lever

Retention Finger
Detail

114

CABLE ENCLOSURE

RELATED APPLICATION(S)

Priority is claimed from U.S. Patent Application No. 63/448,891 filed Feb. 28, 2023, the entirety of which is hereby incorporated by reference herein.

TECHNICAL FIELD

The instant application is generally directed towards a cable enclosure. For example, the instant application is directed towards enclosing a cable enclosure.

BACKGROUND

Cable enclosures may be used to house one or more cables, such as fiber optic cables, coaxial cables, etc. Cable enclosures generally protect such cables and/or (inter) connections thereof, such as underground, suspended above surfaces, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a cable enclosure includes a housing defining an opening through which an interior of the housing is accessible. The cable enclosure also includes an end plate assembly. The end plate assembly includes an end plate defining an aperture and an end cap receivable within the aperture. When the end cap is secured within the aperture and the end plate assembly is attached to the housing, the interior of the housing is not accessible. The cable enclosure further includes a linkage that selectively attaches the end plate assembly to the housing. The linkage includes a member, a lever attached to the member, and a latch attached to the lever. The latch is attached to the lever at a first attachment point and attached to the end plate assembly at a second attachment point. When the lever is in a first position, the first attachment point and the second attachment point are spaced apart a first distance whereby a surface of the member is in contact with a surface of the housing. When the lever is in the first position, the end cap is secured within the aperture, and the end plate assembly is attached to the housing such that the interior of the housing is not accessible. When the lever is in a second position, the first attachment point and the second attachment point are spaced apart a second distance whereby the surface of the member is not in contact with the surface of the housing, the end cap is not secured within the aperture, and the end plate assembly is not attached to the housing such that the interior of the housing is accessible through at least one of the aperture or the opening.

According to an aspect, a cable enclosure includes a housing defining an opening through which an interior of the housing is accessible. The cable enclosure also includes an end plate assembly that, when attached to the housing, covers the opening such that the interior of the housing is not accessible. The cable enclosure further includes a linkage attached to at least one of the housing or the end plate assembly and that selectively attaches the end plate assembly to the housing. When the linkage is in a first position, the end plate assembly is attached to the housing and when the linkage is in a second position, the end plate assembly is not attached to the housing.

According to an aspect, a linkage that selectively attaches an end plate assembly of a cable enclosure to a housing of the cable enclosure includes a member and a lever attached to the member. The linkage also includes a latch attached to the lever at a first attachment point and for attachment to the end plate assembly at a second attachment point. When the lever is in a first position, the first attachment point and the second attachment point are spaced apart a first distance whereby a surface of the member is in contact with a surface of the housing and the end plate assembly is attached to the housing. When the lever is in a second position, the first attachment point and the second attachment point are spaced apart a second distance whereby the surface of the member is not in contact with the surface of the housing and the end plate assembly is not attached to the housing.

According to an aspect, an end plate assembly includes an end plate that, when attached to a housing, covers an opening in the housing such that an interior of the housing is not accessible through the opening. The end plate includes a grommet defining an opening for a cable passing into the interior of the housing. The end plate also includes a retainer and an end cap. The end cap includes a body and a lever movable between a first position and a second position relative to the body. When the lever is in the first position, the lever cooperates with the retainer to locate the body a first distance from the grommet such that a first force is applied to the grommet by the body causing the opening defined by the grommet to have a first size. When the lever is in the second position, the lever cooperates with the retainer to locate the body a second distance, greater than the first distance, from the grommet such that a second force, less than the first force, is applied to the grommet by the body causing the opening defined by the grommet to have a second size greater than the first size.

According to an aspect, an end plate assembly includes an inner end plate and an outer end plate. The end plate assembly also includes a grommet located between the inner end plate and the outer end plate, the grommet defining an opening for a cable passing through the end plate assembly. The end plate assembly further includes a fastener cooperating with the inner end plate and the outer end plate. The end plate assembly still further includes a lever attached to the fastener, the lever movable between a first position and a second position relative to the fastener. When the lever is in the first position, the lever cooperates with the fastener such that the inner end plate and the outer end plate are spaced apart a first distance whereby a first force is applied to the grommet by the inner end plate and the outer end plate causing the opening defined by the grommet to have a first size. When the lever is in the second position, the lever cooperates with the fastener such that the inner end plate and the outer end plate are spaced apart by a second distance, greater than the first distance, whereby a second force, less than the first force, is applied to the grommet by the inner end plate and the outer end plate causing the opening defined by the grommet to have a second size greater than the first size.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
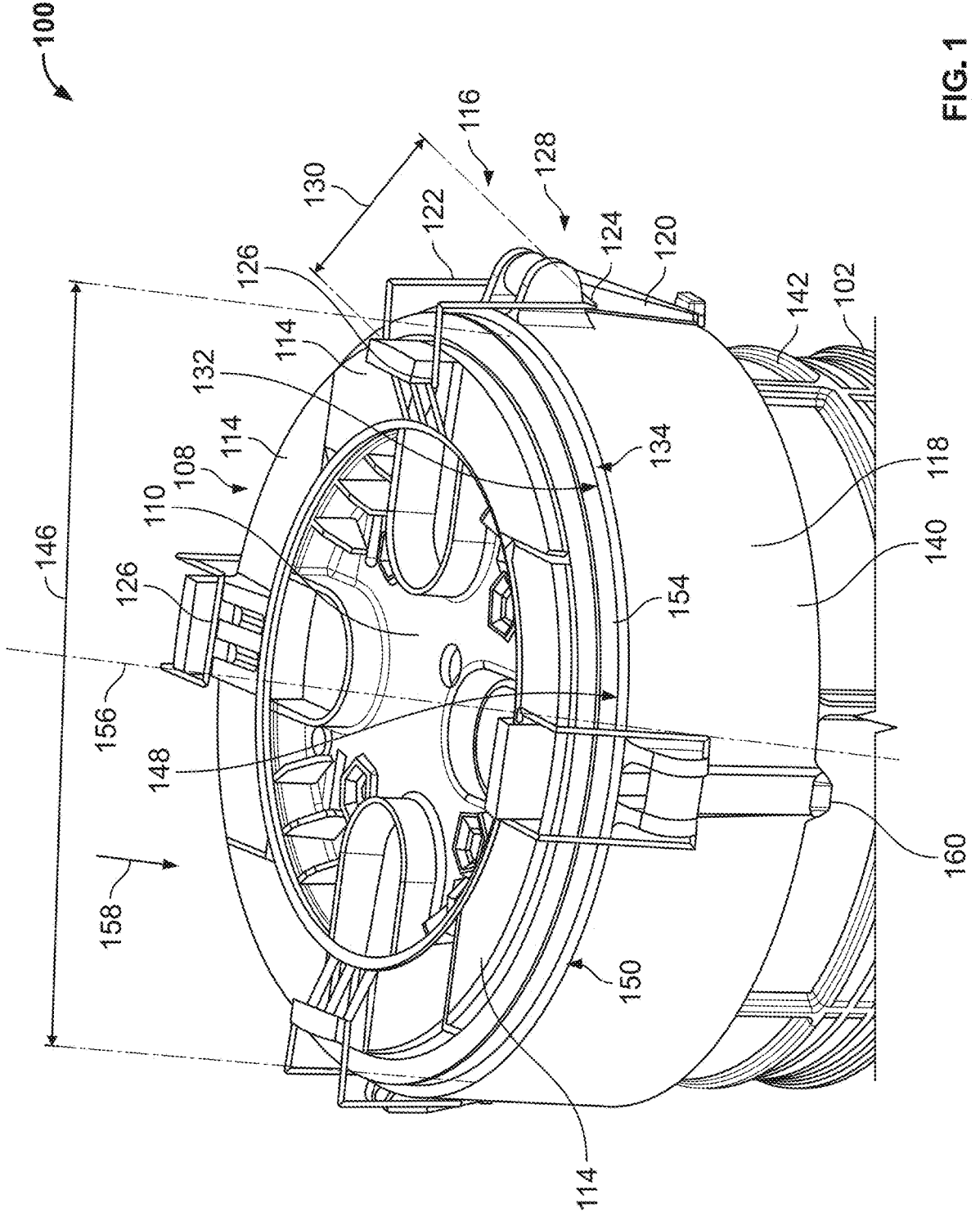
FIG. 1 is an illustration of an example enclosure with an end plate assembly.
Figure 2:
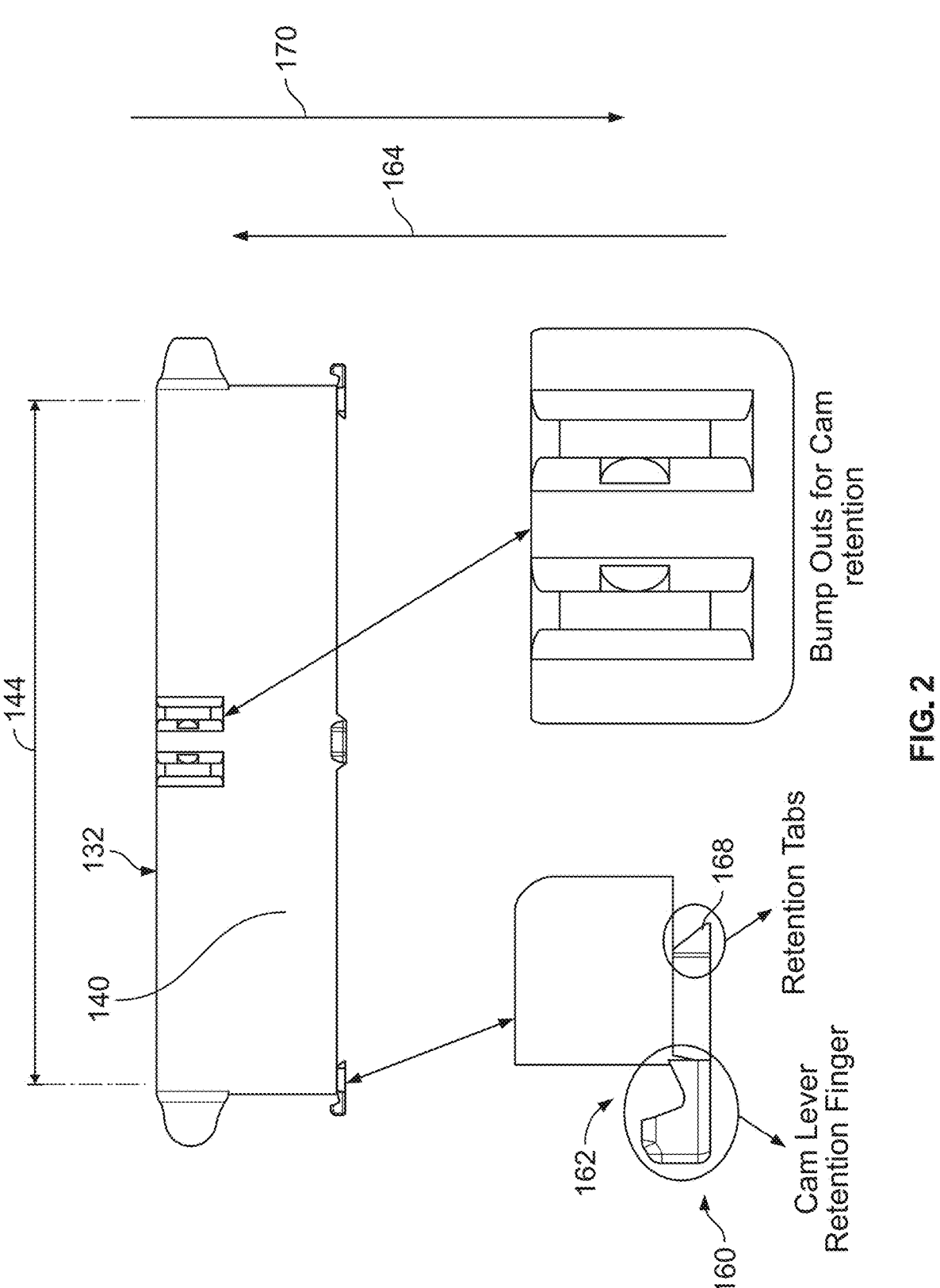
FIG. 2 is an illustration of an example sleeve.
Figure 3:
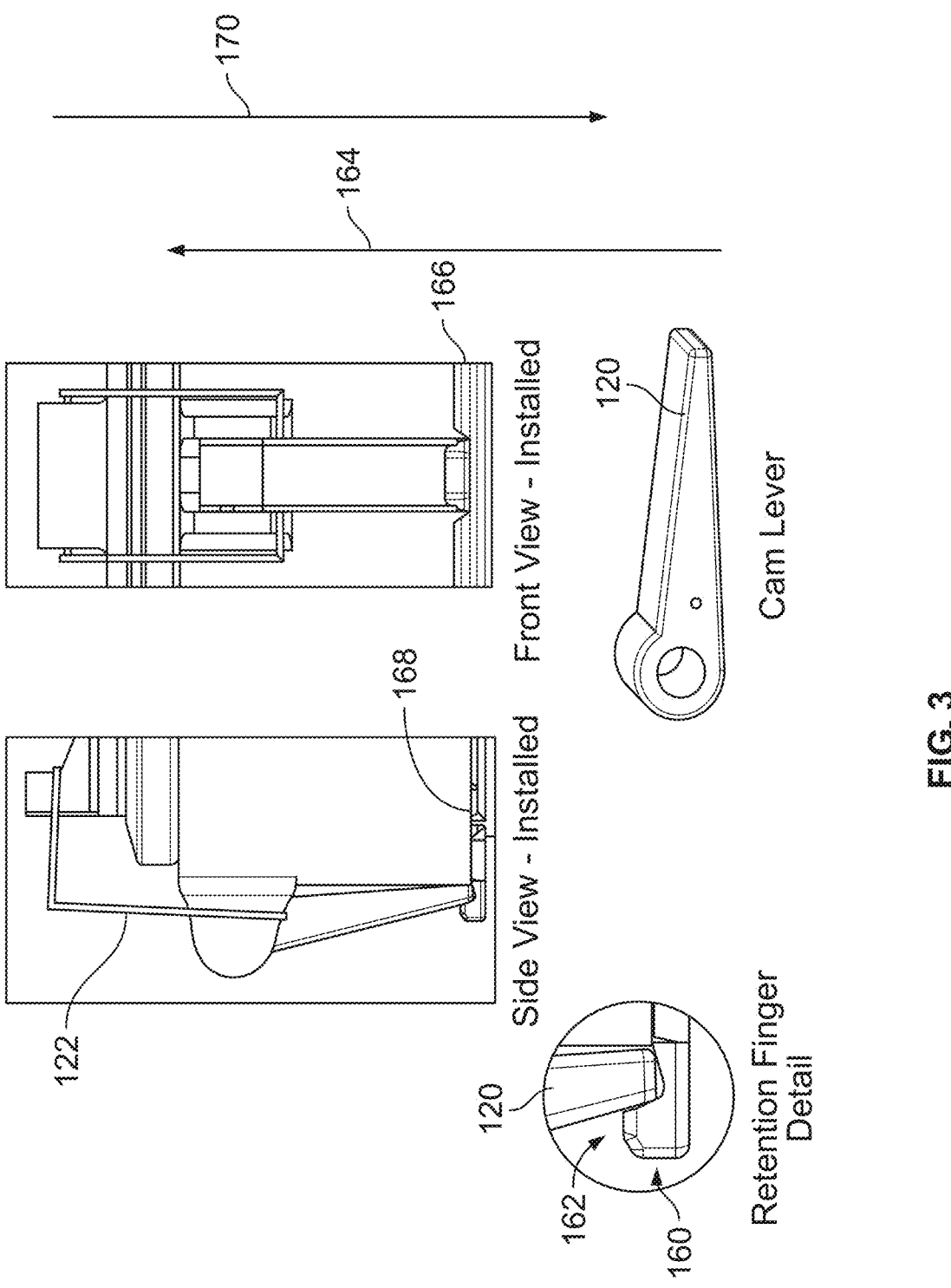
FIG. 3 is an illustration of example cam levers and latches.
Figure 4:
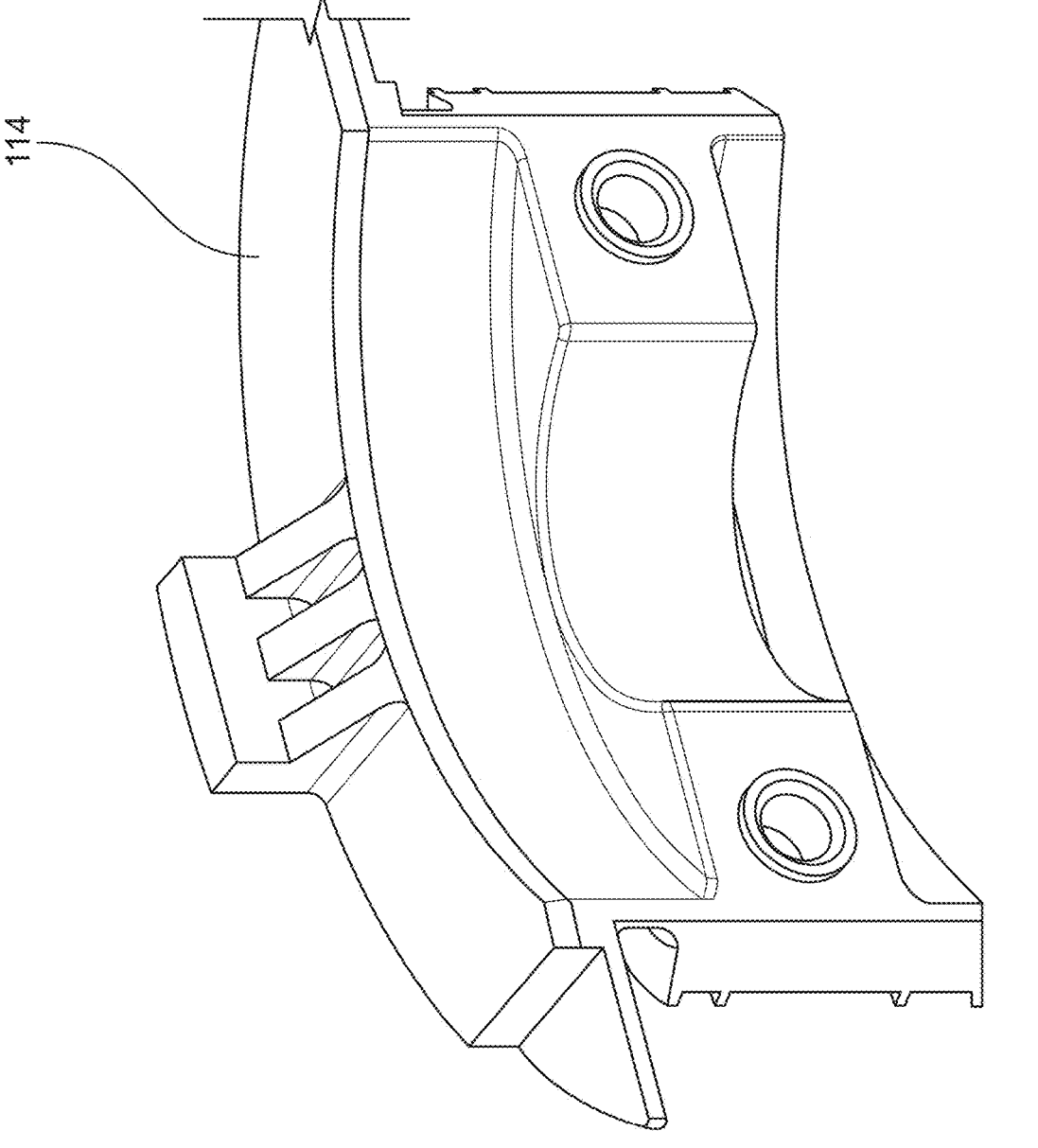
FIG. 4 is an illustration of an example end plate cap.
Figure 5:
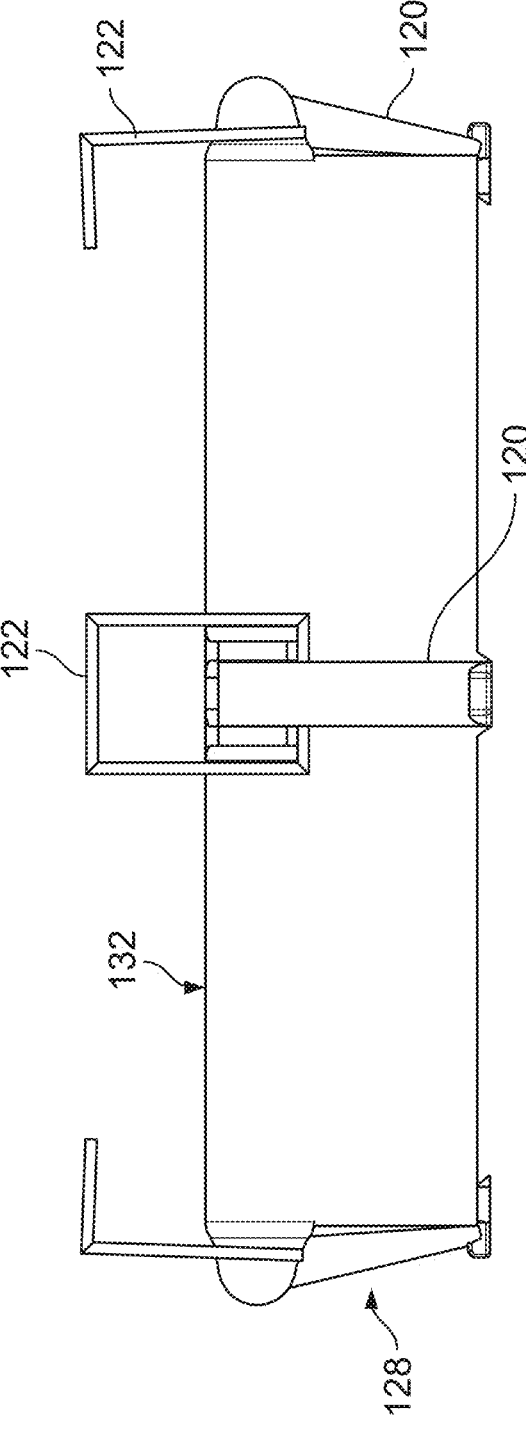
FIG. 5 is an illustration of an example sleeve assembly.
Figure 6:
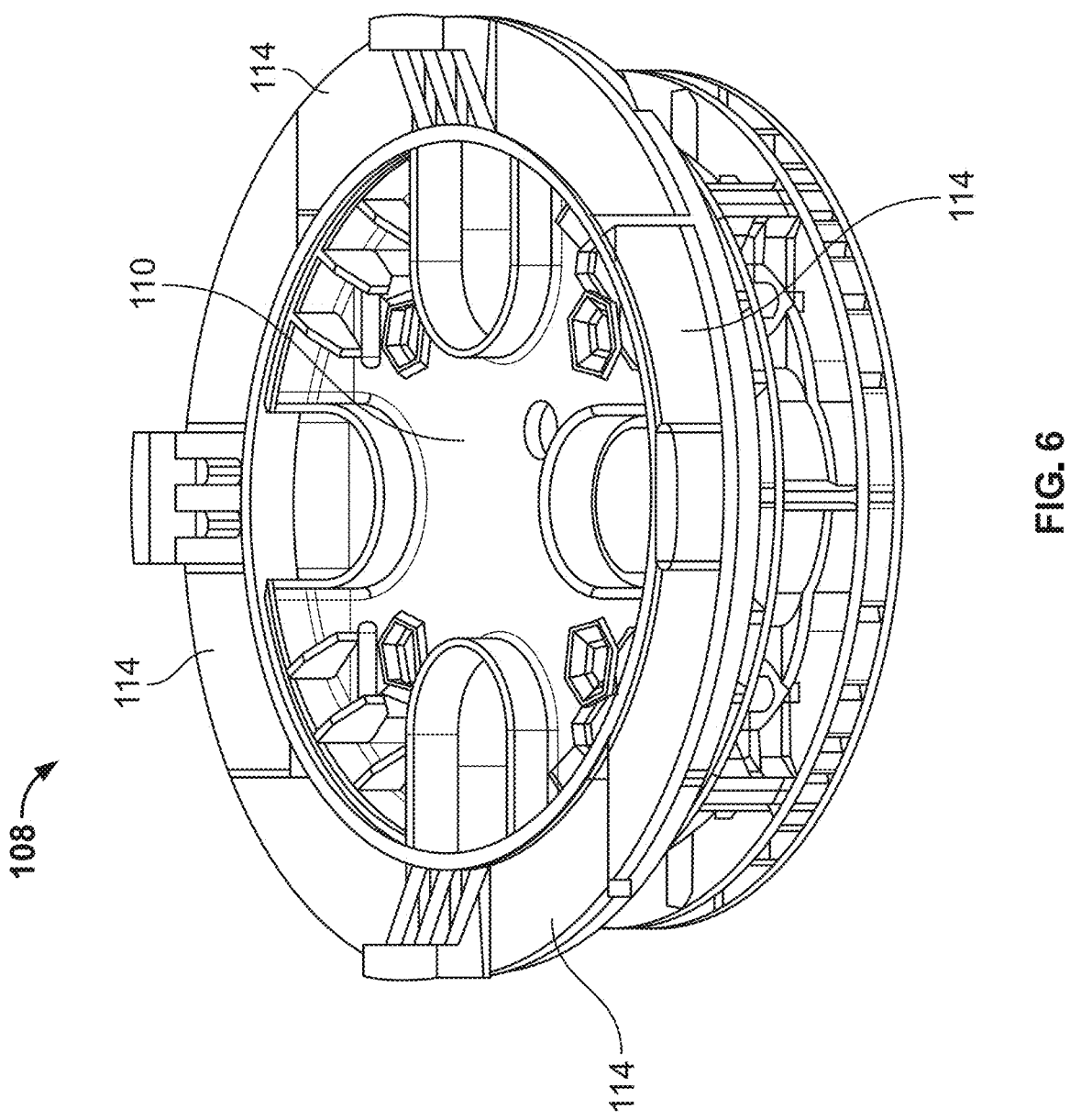
FIG. 6 is an illustration of an example end plate assembly.
Figure 7:
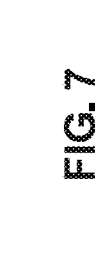
FIG. 7 is an illustration of an example enclosure with an end plate assembly.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

For purposes of clarity, the present disclosure uses the terms telecommunication cables or simply "cables" having one or more telecommunication lines therein. However, such use is only one example, and it is understood and intended that the apparatus of the present disclosure is equally suitable for use with other types of cables including, but not limited to, fiber optic cables, copper wire cables, coaxial cables, drop lines, branch lines, and distribution lines, to name a few. Similarly, the disclosure uses the terms telecommunication line splices, or simply "splices." However, such use is exemplary only, and it is understood and intended that the apparatus of the present disclosure is equally suitable for use with other types of interconnections including, but not limited to, splices, connectors, hybrid connectors, and optical or electrical components, to name a few.

Telecommunication cables are ubiquitous and used for distributing all manner of data across vast networks. Many cables are electrically conductive cables (typically copper), although the use of optical fiber cables is growing rapidly in telecommunication systems as larger and larger amounts of data are transmitted. A telecommunication cable typically includes a bundle of individual telecommunication lines (either optical fibers or copper wires) that are encased within an exterior sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual user locations such as homes, businesses, offices, and so on.

At each point where a telecommunication cable is opened, it is necessary to provide some type of enclosure to protect the exposed interior of the cable. Commonly, the enclosure has one or more ports through which cables enter and/or exit the enclosure. Once inside the enclosure, the cable is opened to expose the telecommunication lines therein. Telecommunication enclosures are constructed to facilitate the management and protection of individual telecommunication lines and splices thereof. For example, conventional enclosures have re-enterable housings and are designed to incorporate splice trays to assist a craftsman in creating a splice connection between two telecommunication lines. Once all required splices are made, the enclosure is secured to protect the opened portion of the cable from moisture, dust, insects, and other hazards.

Many of these telecommunication cables include a conductive sheath that can be comprised of metal, for example, a metal-sheathed fiber optic cable. These telecommunication cables are sometimes buried underneath a surface of the ground without being encased in a conduit or other, similar rigid protection structure. In the event of damage to a buried telecommunication cable, a craftsman or utility worker can use a tool to send electrical pulses through the metal sheath in telecommunication cables in order to aid location efforts of the damaged telecommunication cable.

Referring to the FIGS. 1 through 7, an example cable enclosure 100 includes a housing 102 defining an opening 104 through which an interior 106 of the housing 102 is accessible. An end plate assembly 108 includes an end plate 110 defining an aperture 112. An end cap 114 is receivable within the aperture 112, such that when the end cap 114 is secured within the aperture 112 and the end plate assembly 108 is attached to the housing 102, the interior 106 of the housing 102 is not accessible. A linkage 116 selectively attaches the end plate assembly 108 to the housing 102. The linkage 116 includes a member 118, a lever 120 attached to the member 118, and a latch 122 attached to the lever 120 at a first attachment point 124 and attached to the end plate assembly 108 at a second attachment point 126.

When the lever 120 is in a first position 128, the first attachment point 124 and the second attachment point 126 are spaced apart a first distance 130 whereby a surface 132 of the member 118 is in contact with a surface 134 of the housing 102. Additionally, when the lever 120 is in a first position 128, the end cap 114 is secured within the aperture 112, and the end plate assembly 108 is attached to the housing 102 such that the interior 106 of the housing 102 is not accessible. When the lever 120 is in a second position 136, the first attachment point 124 and the second attachment point 126 are spaced apart a second distance 138 whereby the surface 132 of the member 118 is not in contact with the surface 134 of the housing 102. Additionally, when the lever 120 is in a second position 136, the end cap 114 is not secured within the aperture 112 and the end plate assembly 108 is not attached to the housing 102 such that the interior 106 of the housing 102 is accessible through at least one of the aperture 112 or the opening 104.

In some examples, the member 118 comprises a collar 140 and the housing 102 comprises a cylinder 142. An inner diameter 144 of the collar 140 can be less than an outer diameter 146 of a flange of the cylinder 142 proximate the opening 104. The surface 132 of the member 118 can be an upper surface 148 of the collar 140. The surface 134 of the housing 102 can be a bottom surface 150 of the cylinder 142. When the lever 120 is in the first position, the upper surface 148 of the collar 140 is in contact with the bottom surface 150 of the cylinder 142.

In some examples, the member 118 includes a collar 140 while the housing 102 includes a cylinder 142. When the lever 120 is in the first position 128, an upper surface 148 of the collar 140 is in contact with a bottom surface 152 of a protrusion 154 extending from the cylinder 142 away from the interior 106 of the housing 102.

In some examples, the cable enclosure 100 is constructed such that when the lever 120 is in the first position 128, an upper surface 148 of the member 118 is in contact with a bottom surface 152 of a protrusion 154 extending away from the interior 106 of the housing 102. The cable enclosure 100 can also be constructed such that when the lever 120 is in the first position 128, a force applied to the end plate assembly 108 through the latch 122 exceeds a threshold force to attach the end plate assembly 108 to the housing 102.

Additionally, when the lever 120 is in the second position 136, the force applied to the end plate assembly 108 through the latch 122 does not exceed the threshold force such that the end plate assembly 108 is not attached to the housing 102. In some examples, the housing 102 extends along a housing axis 156 and the force is applied in a direction 158 parallel to the housing axis 156. Some examples can include a retention mechanism 160 to retain the lever 120 in the first position 128.

In some examples, the retention mechanism 160 defines a groove 162 dimensioned to receive the lever 120 when the lever 120 is in the first position 128. The member 118 travels in a first direction 164 toward the end plate assembly 108 when the lever 120 is moved from the second position 136 to the first position 128 to attach the end plate assembly 108 to the housing 102. Furthermore, the housing 102 can include a first protrusion 166 extending away from the interior 106 of the housing 102. The member 118 can include a second protrusion 168 extending toward the interior 106 of the housing 102. The second protrusion 168 interferes with the first protrusion 166 to limit an amount of travel of the member 118 in a second direction 170 away from the end plate assembly 108. In some examples, the second protrusion 168 does not limit an amount of travel of the member 118 in the first direction 164.

Another example cable enclosure 100 includes the housing 102 defining the opening 104 through which the interior 106 of the housing 102 is accessible. The end plate assembly 108 that, when attached to the housing 102, covers the opening 104 such that the interior 106 of the housing 102 is not accessible. The cable enclosure 100 can also include a linkage 116 attached to at least one of the housing 102 or the end plate assembly 108 and that selectively attaches the end plate assembly 108 to the housing 102. When the linkage 116 is in a first position 128, the end plate assembly 108 is attached to the housing 102. When the linkage 116 is in the second position 136, the end plate assembly 108 is not attached to the housing 102.

In some examples, the linkage 116 travels in the first direction 164 when moved from the second position 136 to the first position 128 to attach the end plate assembly 108 to the housing 102. As with the previous example, the housing 102 includes the first protrusion 166 extending away from the interior 106 of the housing 102. The linkage 116 can include the second protrusion 168 extending toward the interior 106 of the housing 102. The second protrusion 168 interferes with the first protrusion 166 to limit an amount of travel of the linkage 116 in the second direction 170 opposite the first direction 164. In some examples, the second protrusion 168 does not limit an amount of travel of the linkage 116 in the first direction 164. The housing 102 can extend along the housing axis 156 and the first direction 164 can be parallel to the housing axis 156.

A linkage 116 selectively attaches an end plate assembly 108 of a cable enclosure 100 to a housing 102 of the cable enclosure 100. The linkage 116 includes a member 118 and a lever 120 attached to the member 118. The linkage 116 can also include a latch 122 attached to the lever 120 at a first attachment point 124 and for attachment to the end plate assembly 108 at a second attachment point 126. When the lever 120 is in a first position 128, the first attachment point 124 and the second attachment point 126 are spaced apart a first distance 130 whereby a surface 132 of the member 118 is in contact with a surface 134 of the housing 102 and the end plate assembly 108 is attached to the housing 102. When the lever 120 is in a second position 136, the first attachment point 124 and the second attachment point 126 are spaced apart a second distance 138 whereby the surface 132 of the member 118 is not in contact with the surface 134 of the housing 102 and the end plate assembly 108 is not attached to the housing 102.

A retention mechanism 160 can be included to retain the lever 120 in the first position 128. The retention mechanism 160 can define a groove 162 dimensioned to receive the lever 120 when the lever 120 is in the first position 128.

Figure 8:
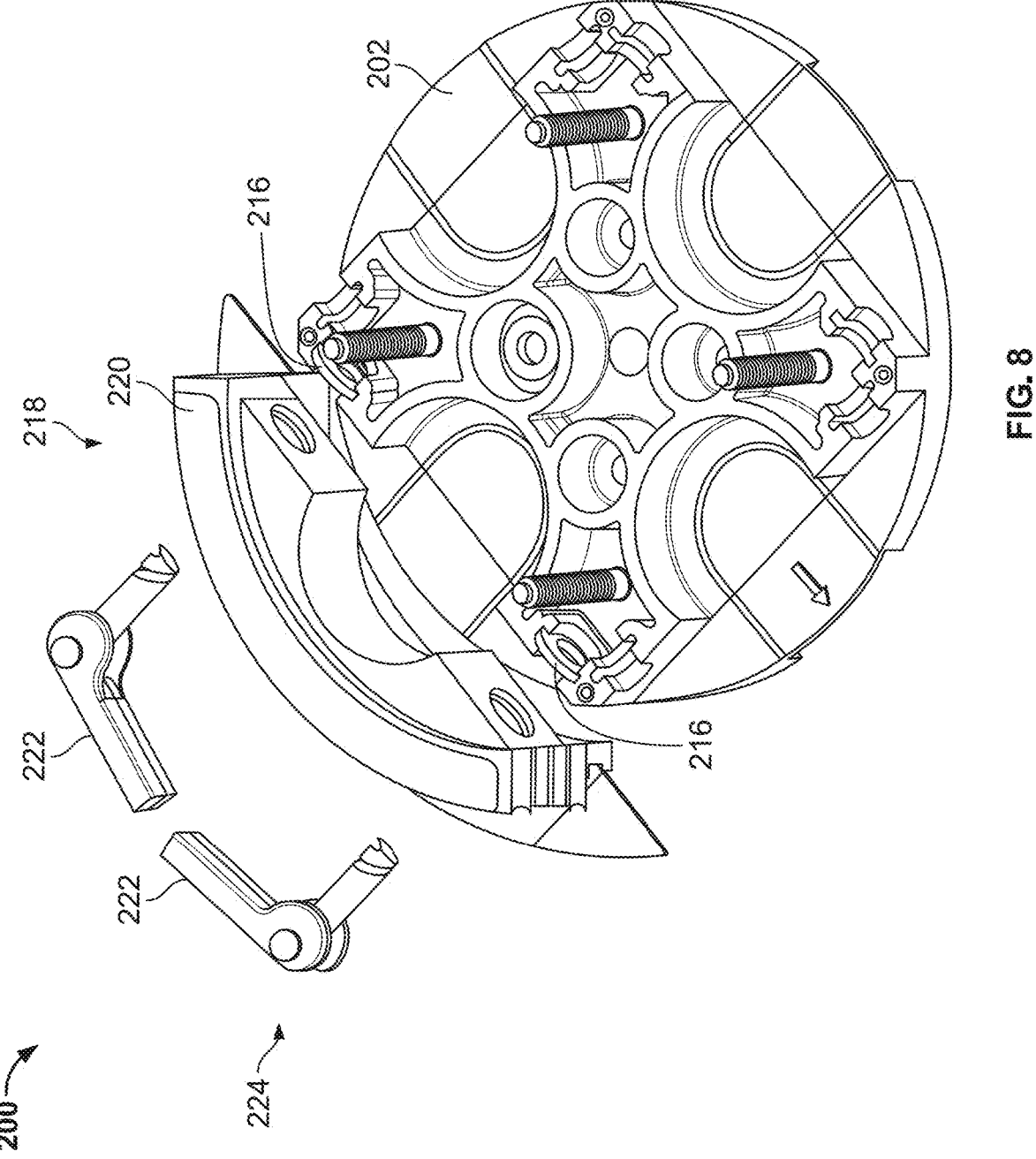
FIG. 8 is an illustration of example tool-less end cap installation/removal.
Figure 9:
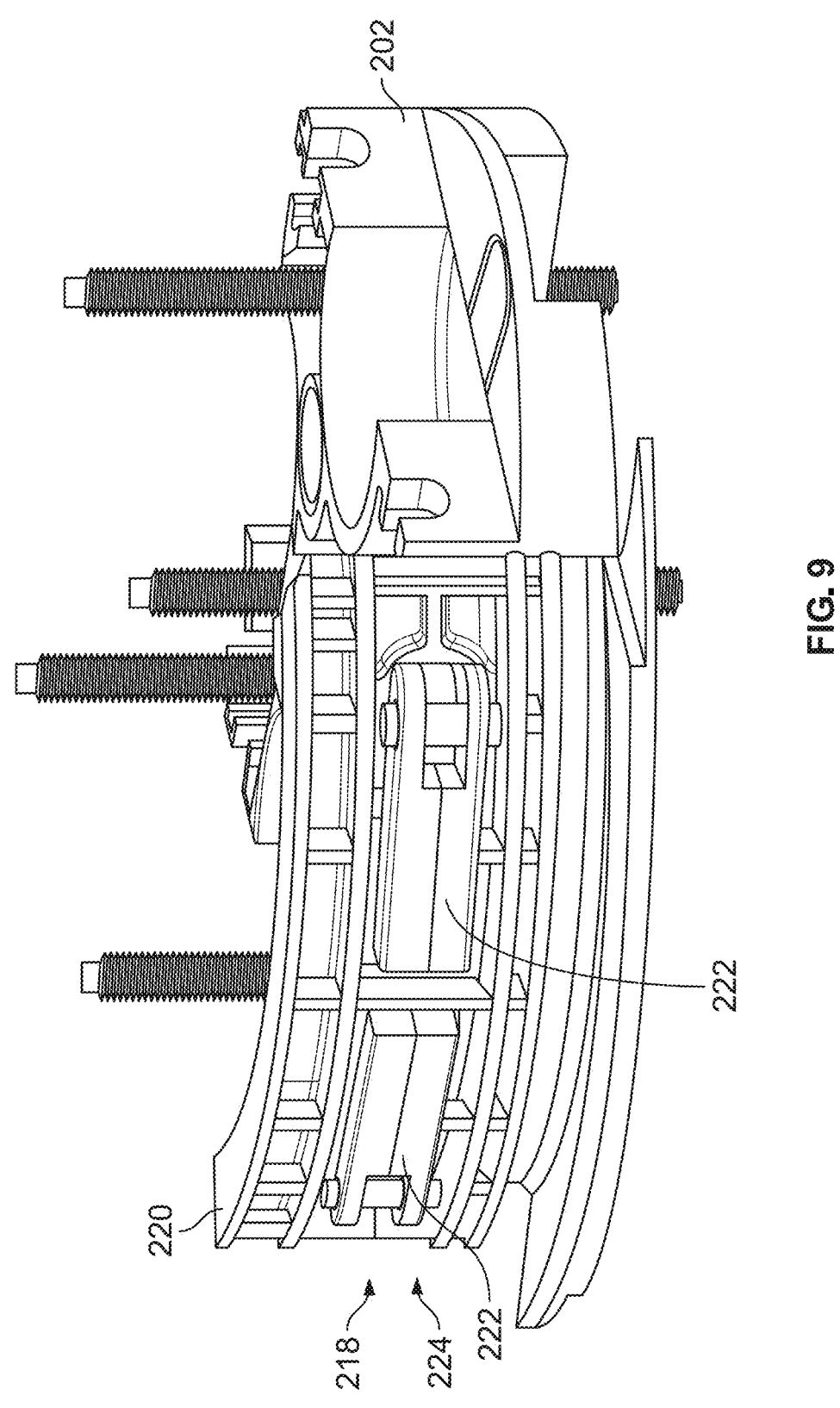
FIG. 9 is similar to FIG. 8, but shows a side perspective view.
Figure 10:
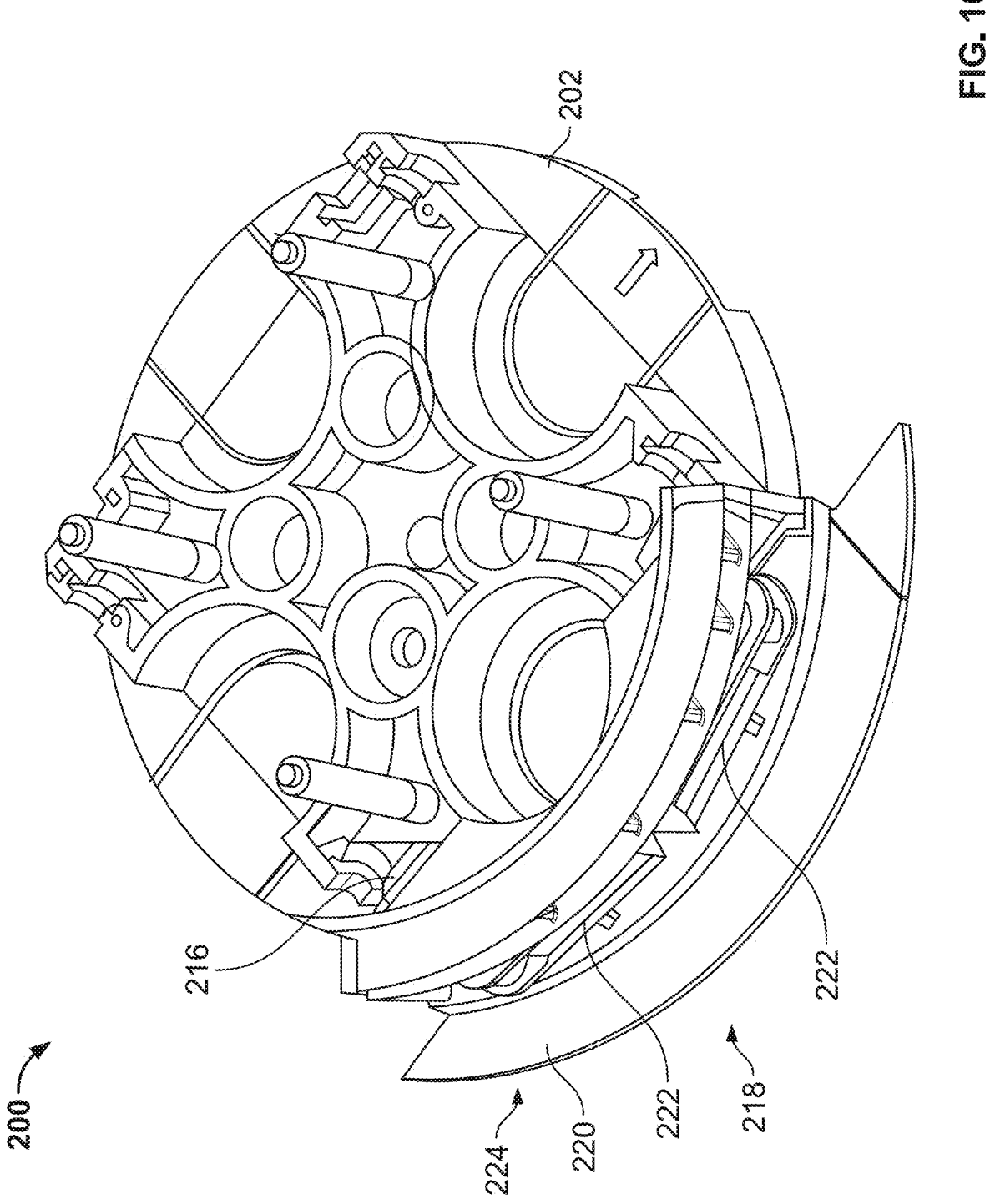
FIG. 10 is similar to FIG. 8, but shows another perspective view.
Figure 11:
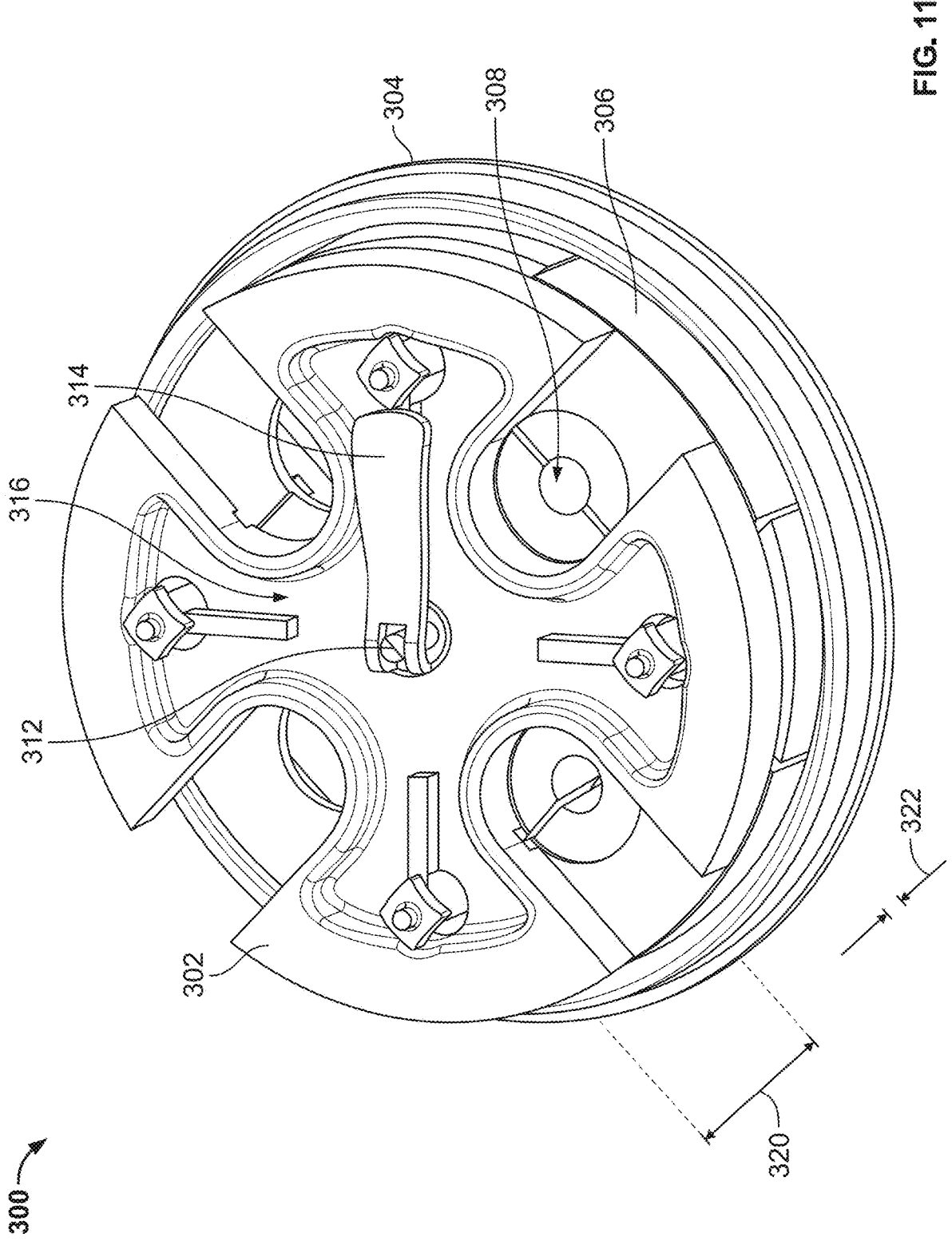
FIG. 11 is an illustration of an example end plate assembly with an inner plate.

As an example of a tool-less end cap installation/removal, attention is directed to FIGS. 8-10. An end plate assembly 200 (FIGS. 8-10) can include an end plate 202 that, when attached to a housing 204, covers an opening 206 in the housing 204 such that an interior 208 of the housing 204 is not accessible through the opening 206. The end plate 202 includes a grommet 210 defining an opening 212 for a cable 214 passing into the interior 208 of the housing 204, a retainer 216, and an end cap 218. The end cap includes a body 220 and a lever 222 movable between a first position 224 and a second position 226 relative to the body 220.

When the lever 222 is in the first position 224, the lever 222 cooperates with the retainer 216 to locate the body 220 a first distance 228 from the grommet 210 such that a first force 230 is applied to the grommet 210 by the body 220 causing the opening 212 defined by the grommet 210 to have a first size. When the lever 222 is in the second position 226, the lever 222 cooperates with the retainer 216 to locate the body 220 a second distance 232, greater than the first distance 228, from the grommet 210 such that a second force 234, less than the first force 230, is applied to the grommet 210 by the body 220 causing the opening 212 defined by the grommet 210 to have a second size greater than the first size.

Figure 12:
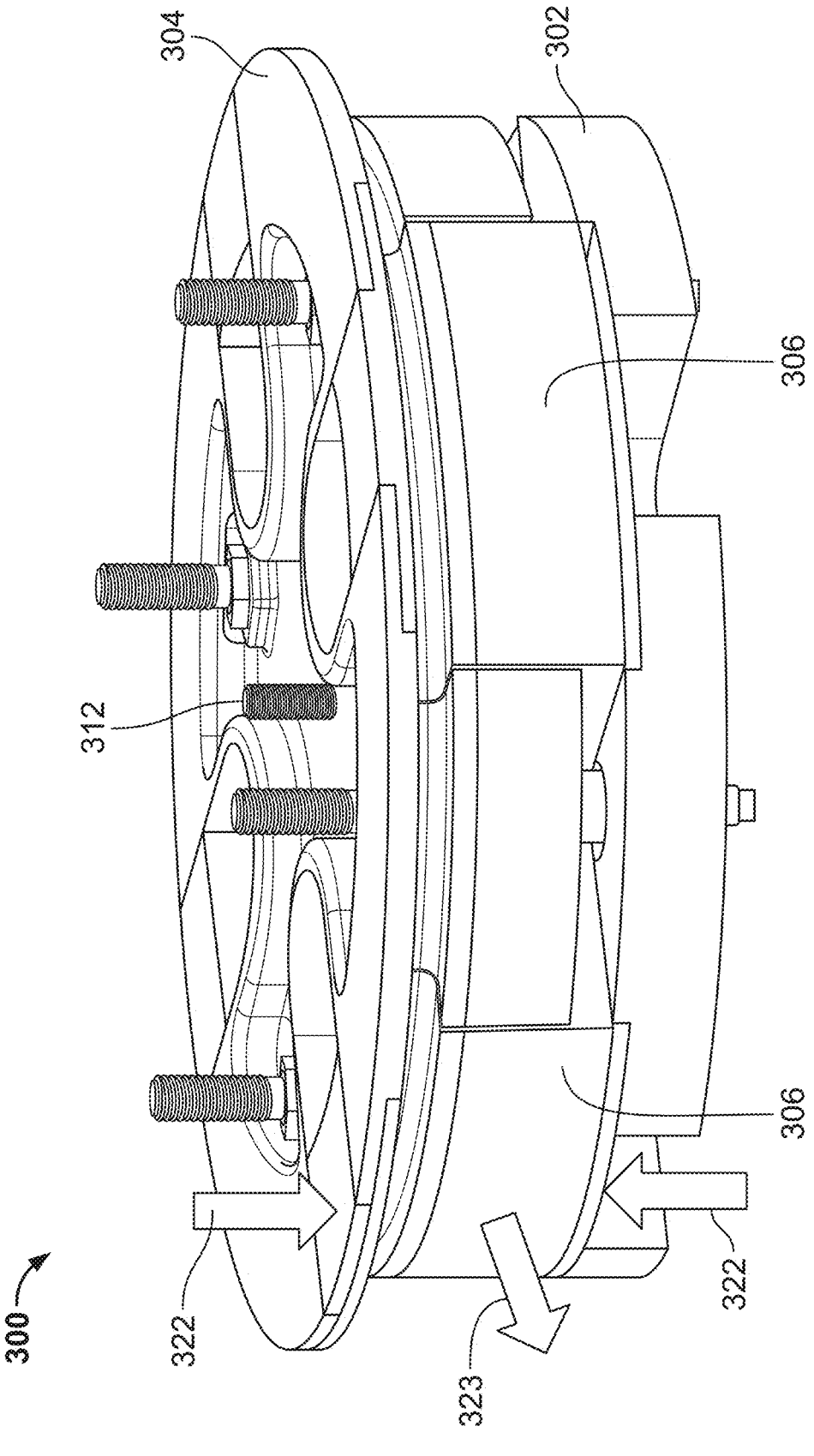
FIG. 12 is an illustration of an example set of steps of general operation of the end plate assembly.
Figure 13:
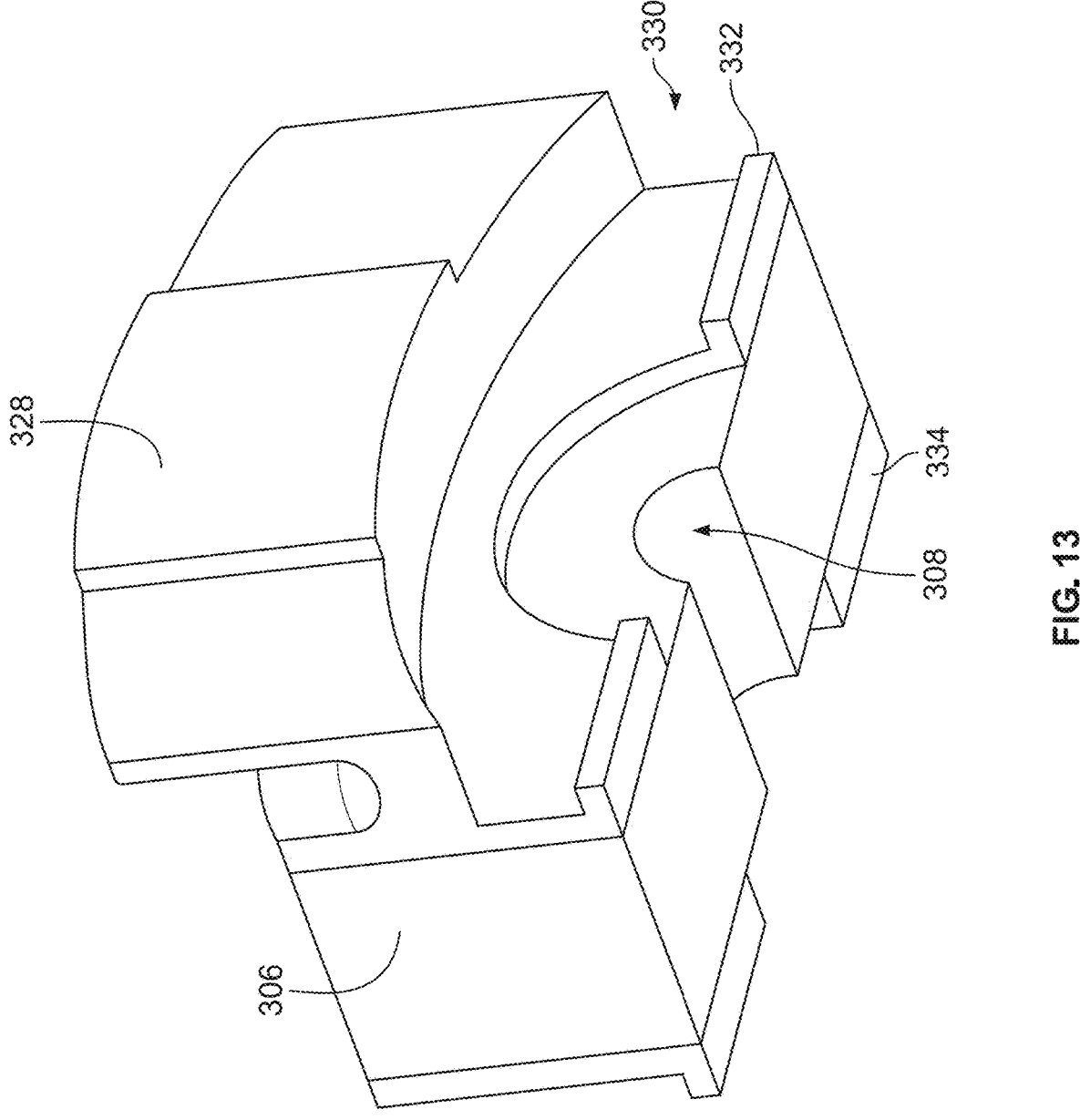
FIG. 13 is an illustration of an example grommet.
Figure 14:
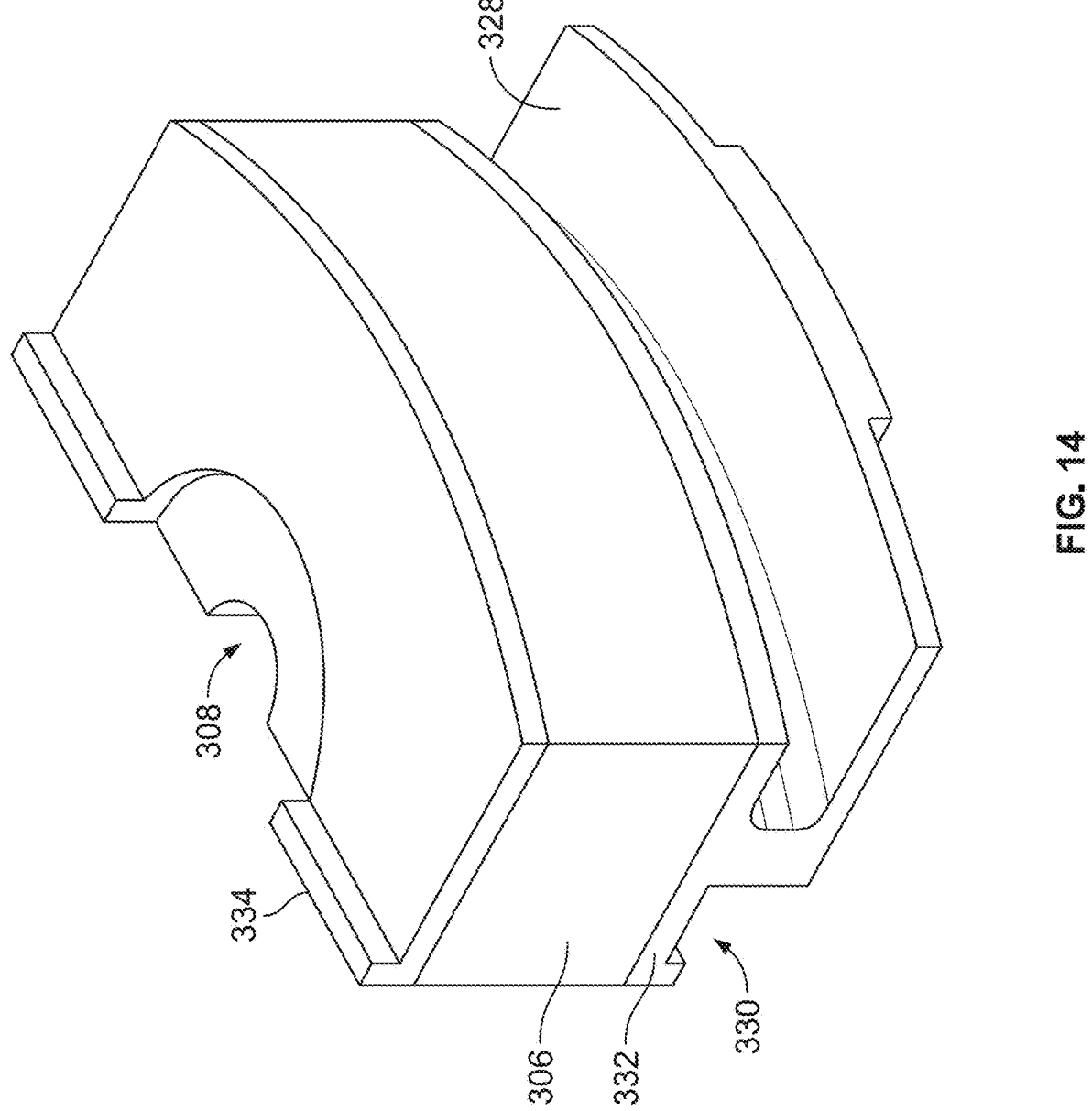
FIG. 14 is a side view illustration of an example grommet.

Turning to FIGS. 11-22, FIG. 11 is an illustration of an example end plate assembly with an inner plate, FIG. 12 is an illustration of an example set of steps of general operation of the end plate assembly and FIGS. 13 and 14 are illustrations of an example grommet.

Figure 15:
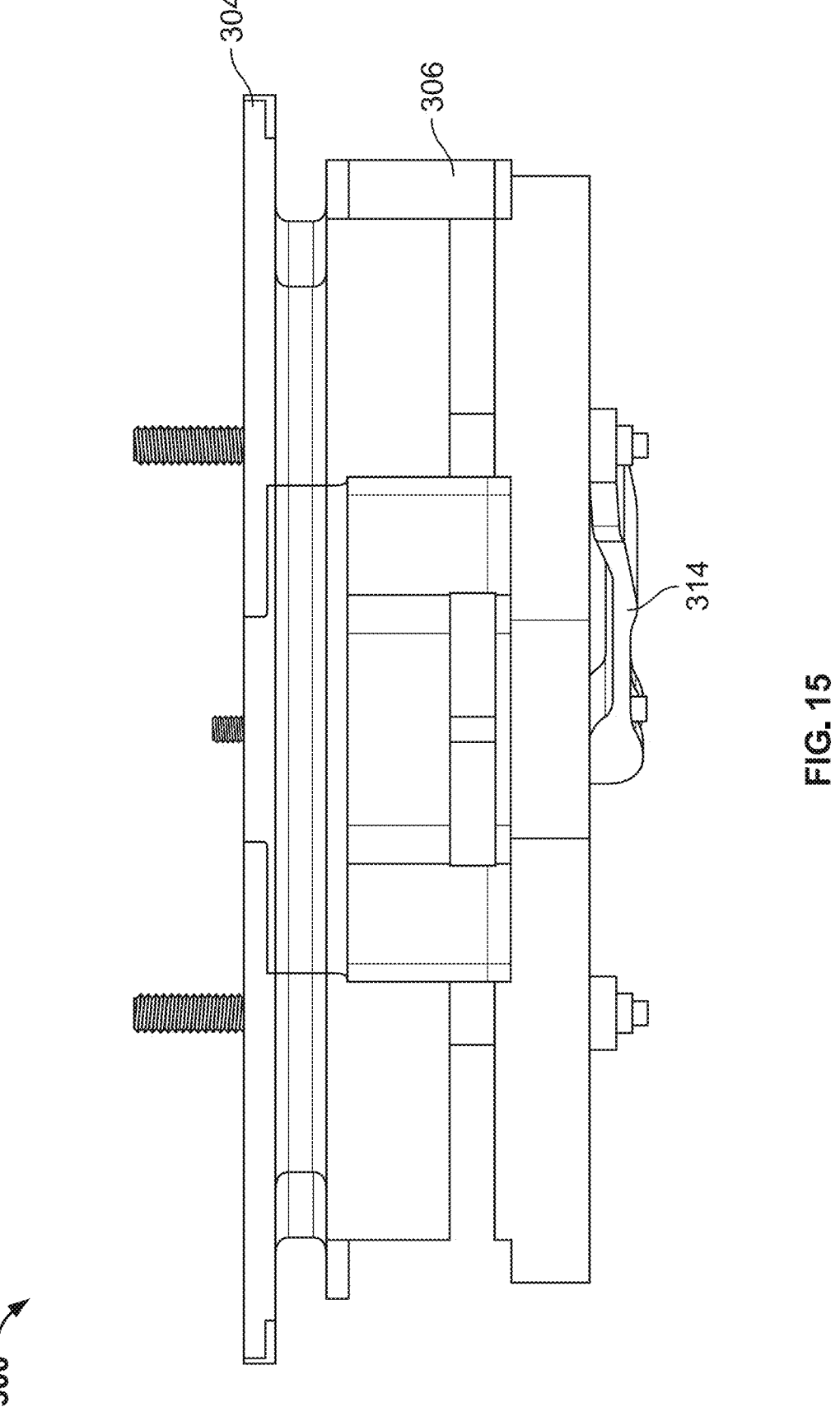
FIG. 15 is a side view illustration of an example end plate assembly.
Figure 16:
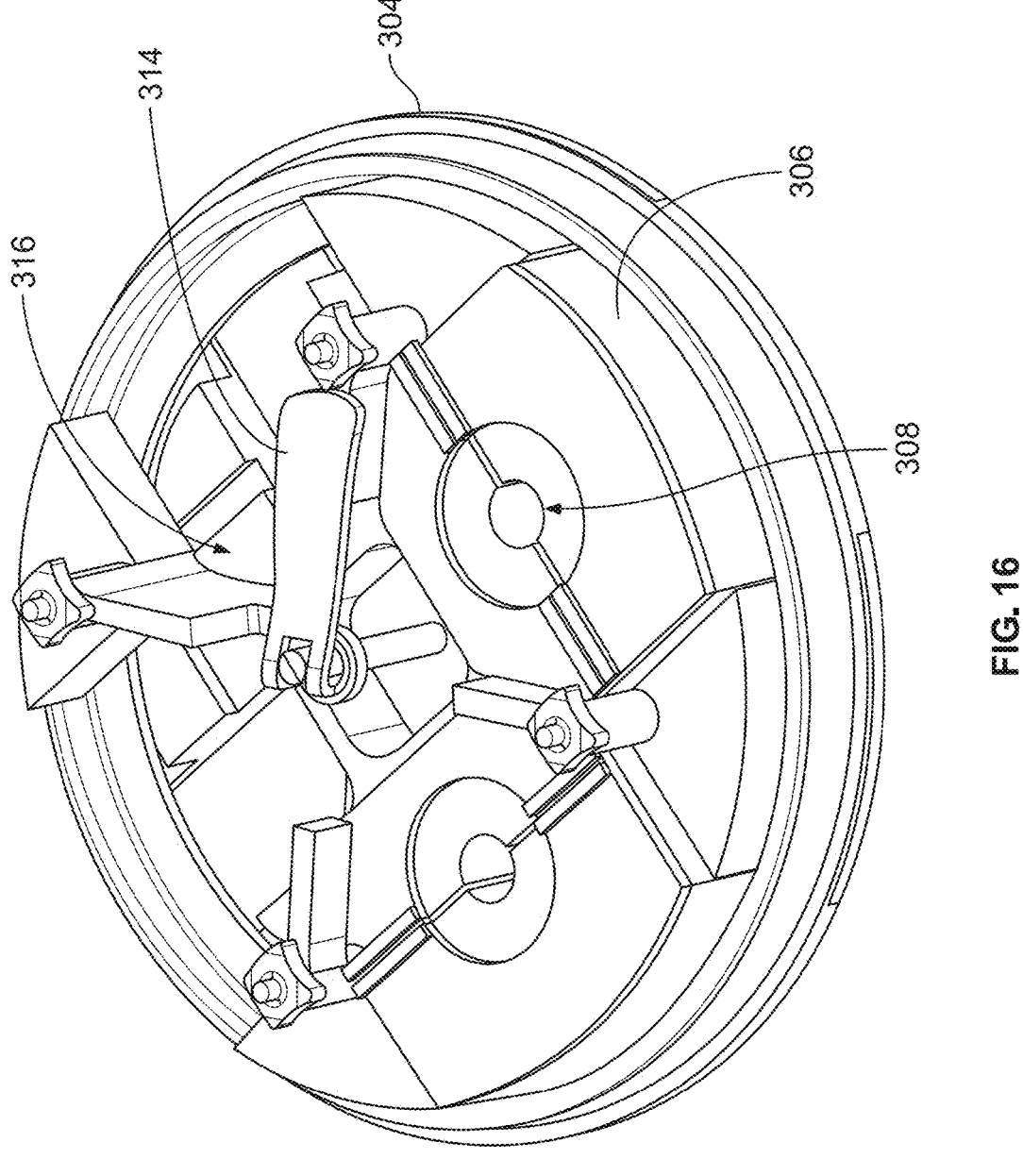
FIG. 16 is an illustration of an example end plate assembly with the inner plate removed.
Figure 17:
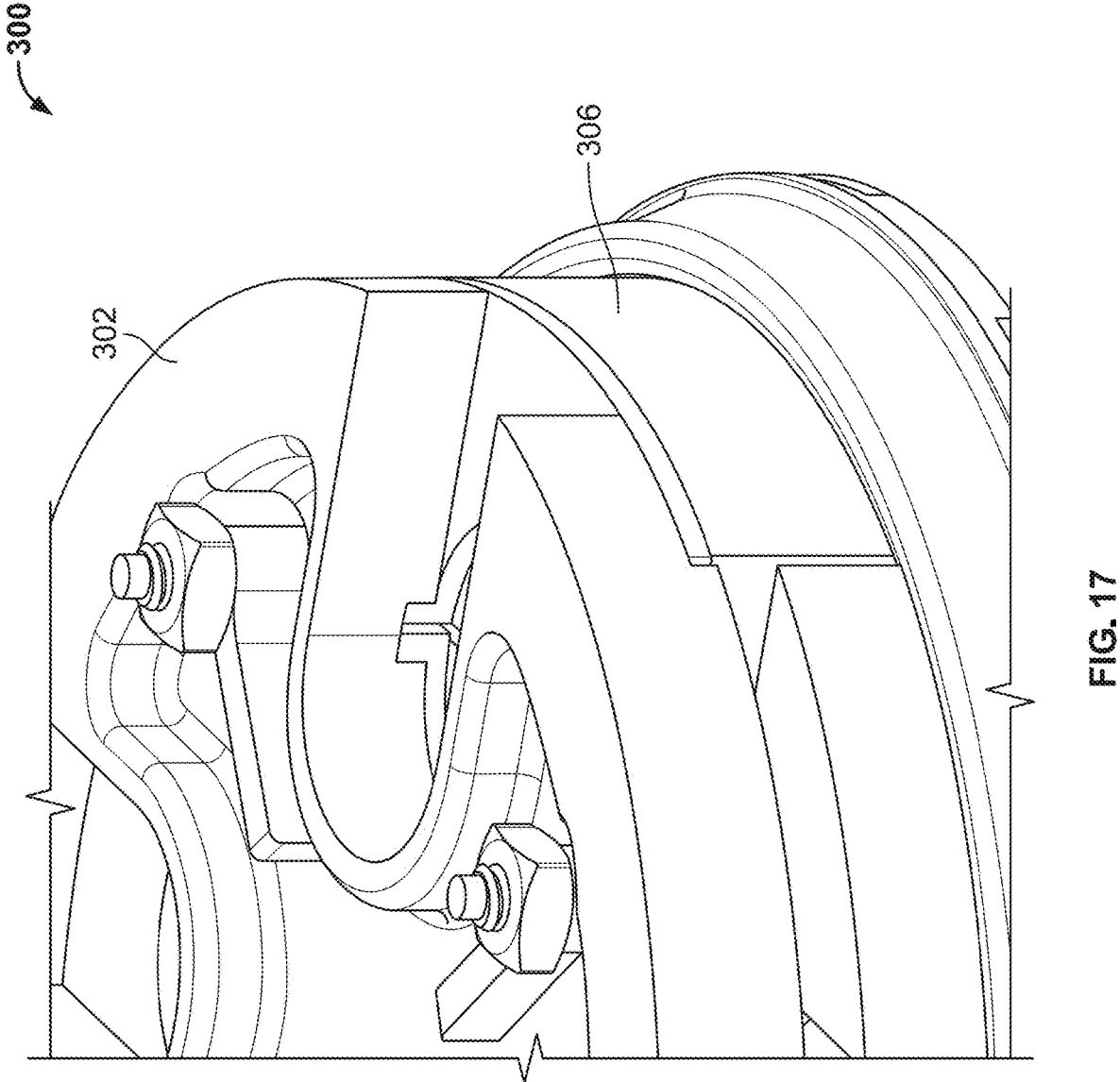
FIG. 17 is a perspective view of a grommet assembly installed into an end plate.
Figure 18:
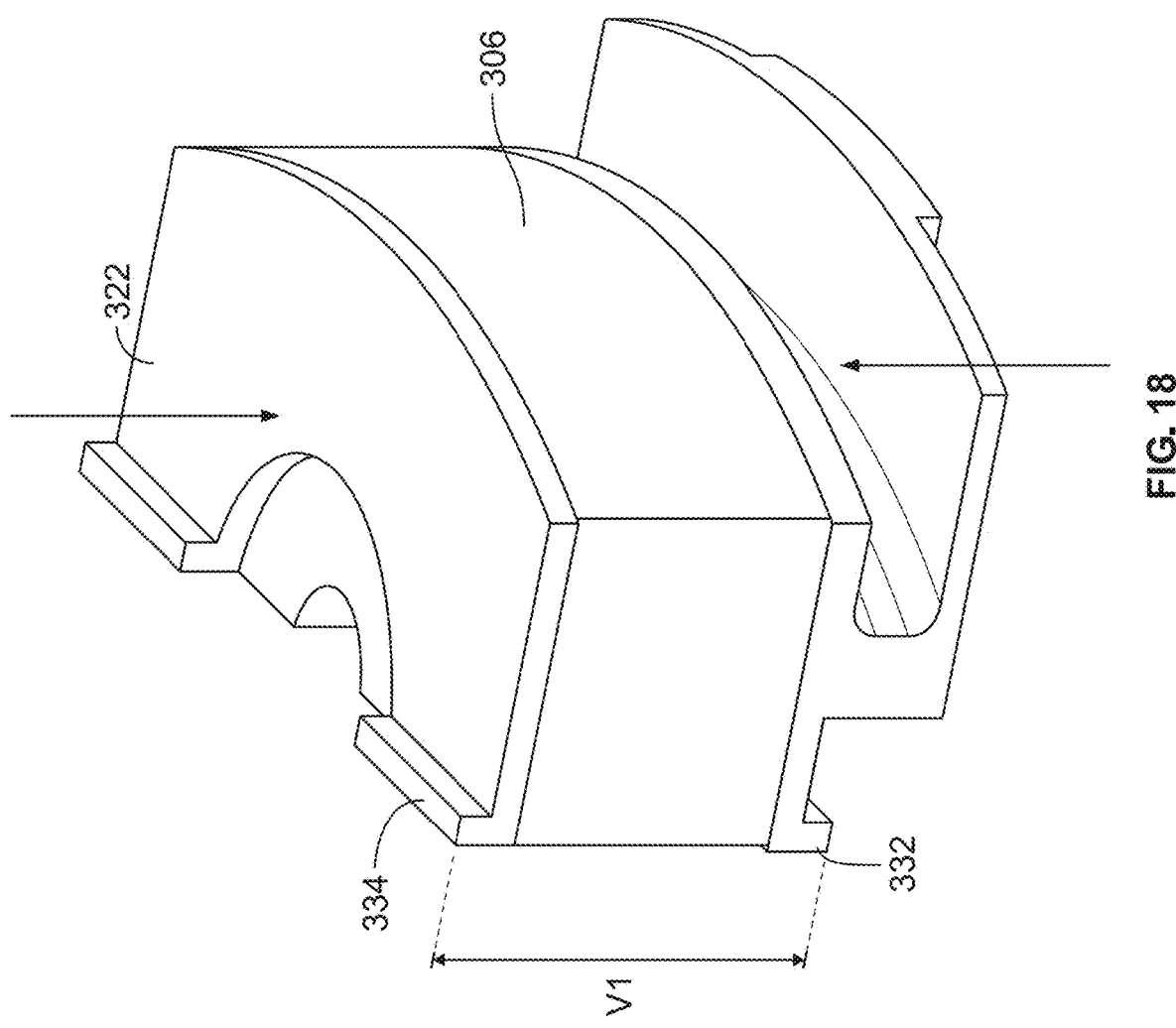
FIG. 18 is an illustration of a grommet assembly.
Figure 19:
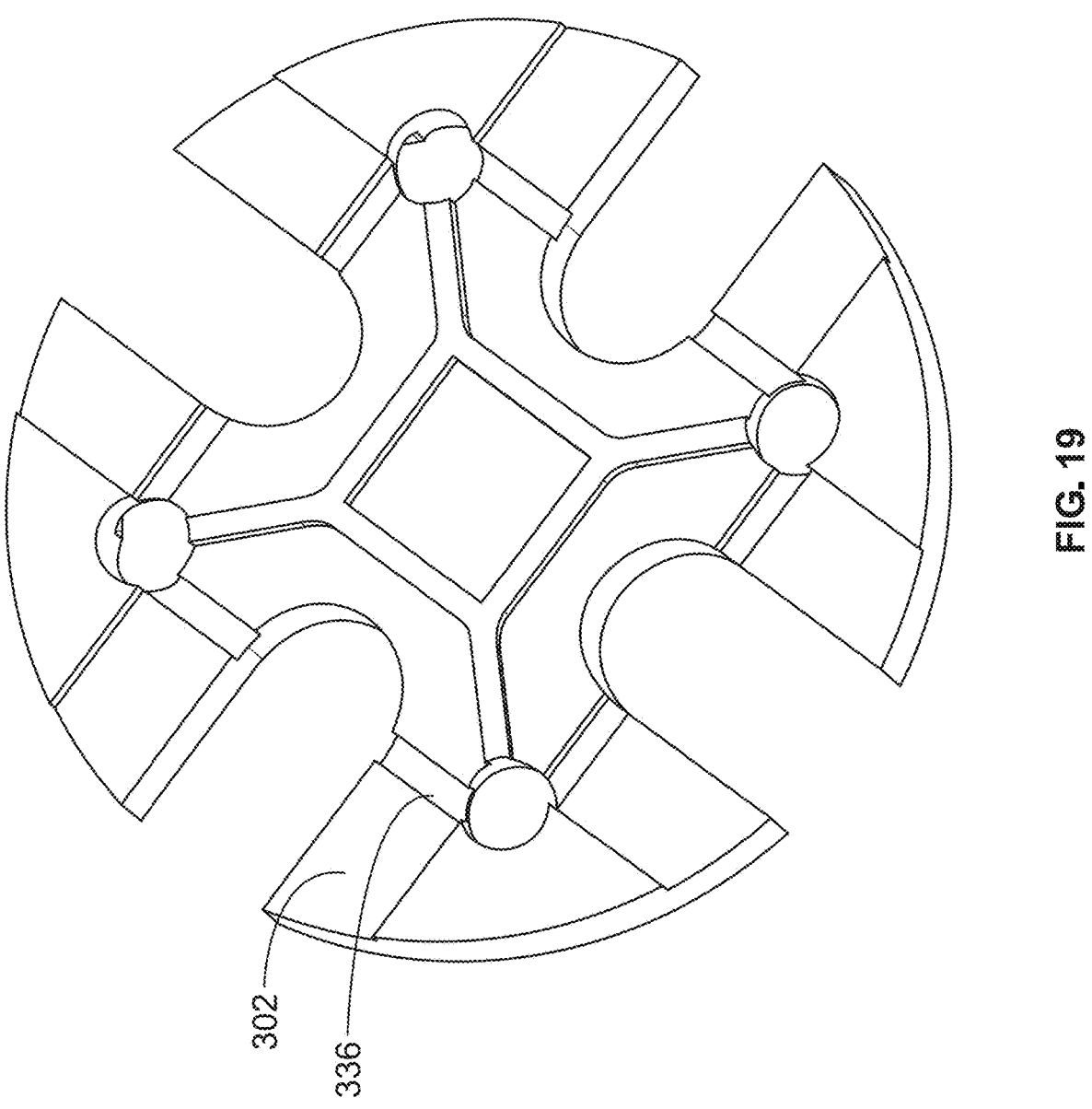
FIG. 19 is an illustration of an example inner end plate.
Figure 20:
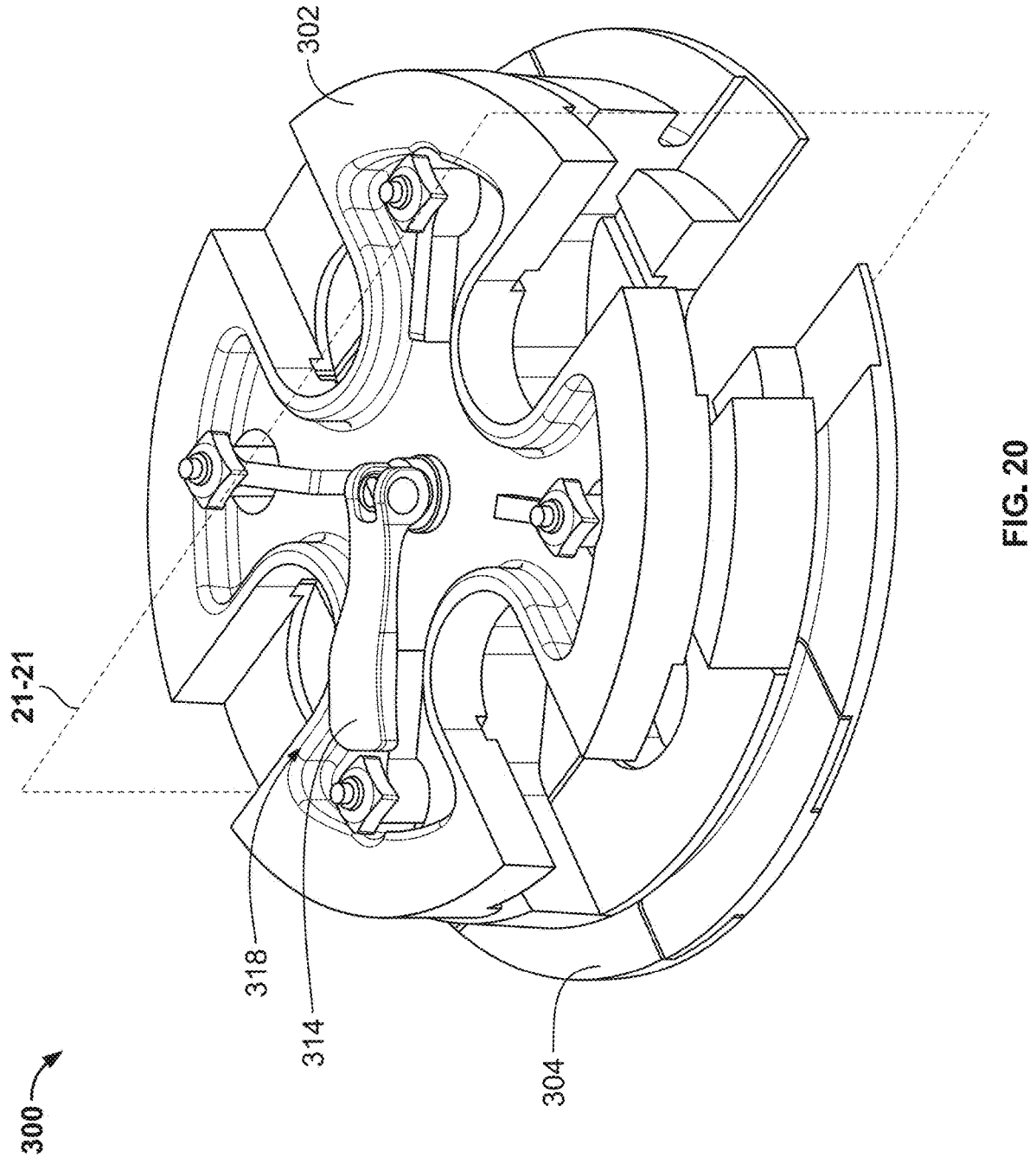
FIG. 20 is an illustration of an end plate assembly.
Figure 21:
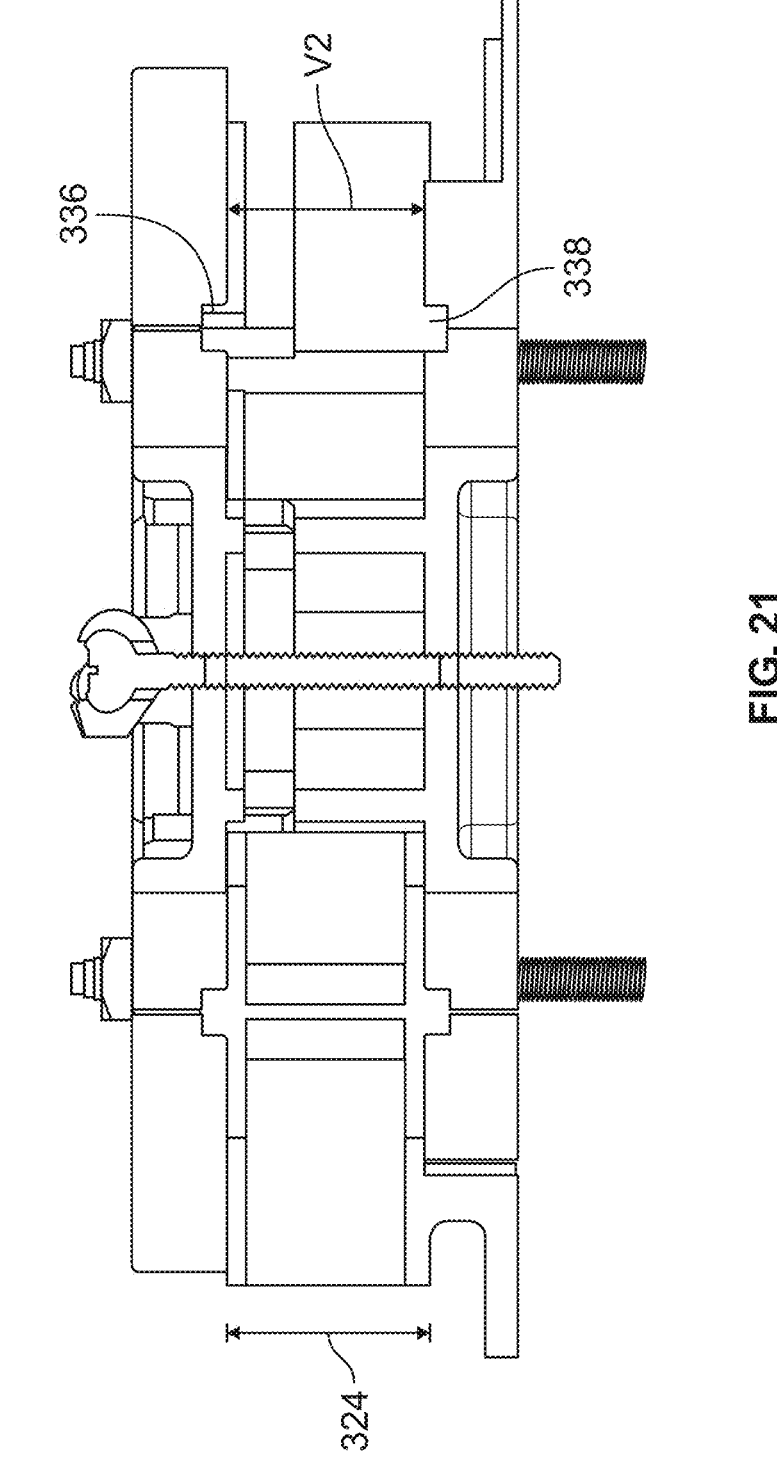
FIG. 21 is an elevation sectional view of the end plate assembly of FIG. 20, and is a section view taken at section plane 21-21 in FIG. 20.
Figure 22:
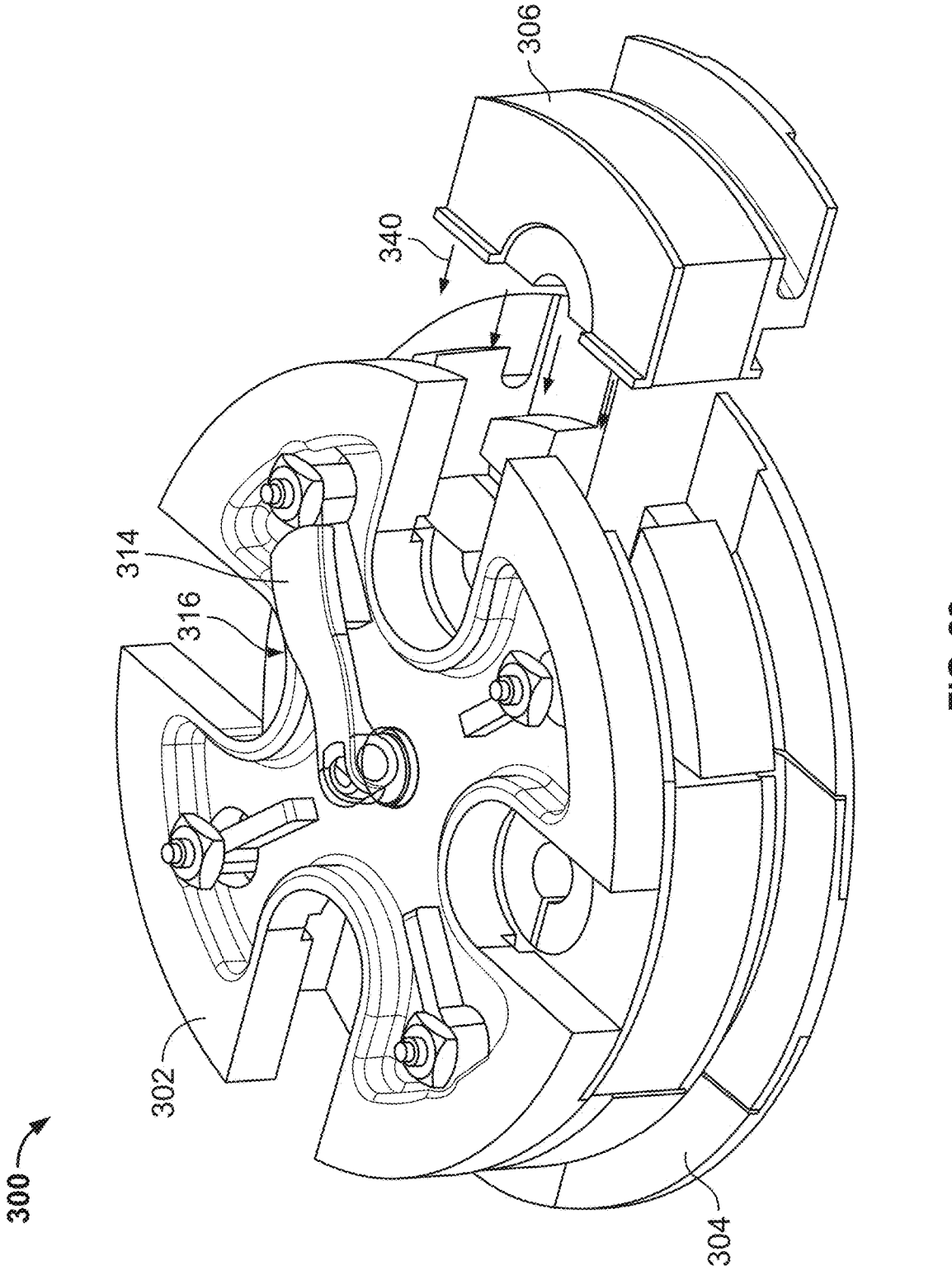
FIG. 22 is a perspective view of the end plate assembly showing an installation direction of the grommet assembly.

Further, FIG. 15 is a side view illustration of an example end plate assembly, FIG. 16 is an illustration of an example end plate assembly with the inner plate removed, FIG. 17 is a perspective view of a grommet assembly installed into an end plate, FIG. 18 is an illustration of a grommet assembly, FIG. 19 is an illustration of an example end plate, FIG. 20 is an illustration of an end plate assembly, FIG. 21 is an elevation sectional view of the end plate assembly of FIG. 20, and FIG. 22 is a perspective view of the end plate assembly showing an installation direction of the grommet assembly.

As such, in some examples (FIGS. 11-14), an end plate assembly 300 includes an inner end plate 302, an outer end plate 304, and a grommet 306 located between the inner end plate 302 and the outer end plate 304. The grommet 306 defines an opening 308 for a cable passing through the end plate assembly 300. The end plate assembly 300 can include a fastener 312 cooperating with the inner end plate 302 and the outer end plate 304. A lever 314 attached to the fastener 312 is movable between a first position 316 (FIGS. 11, 16 and 22) and a second position 318 (FIGS. 20 and 21) relative to the fastener 312.

When the lever 314 is in the first position 316 (FIGS. 11, 16 and 22), the lever 314 cooperates with the fastener 312 such that the inner end plate 302 and the outer end plate 304 are spaced apart a first distance 320. While in the first position 316, a first force 322 is applied to the grommet 306 by the inner end plate 302 and the outer end plate 304 causing the opening 308 defined by the grommet 306 to have a first size or volume V1 (see FIG. 18). As shown within FIG. 12, the grommet 306 has a tendency to try to expand as generally shown by the arrow 323. Such may help provide a sealing and/or gripping effect against the cable enclosure 100.

When the lever 314 is in the second position 318 (FIGS. 20 and 21), the lever 314 cooperates with the fastener 312 such that the inner end plate 302 and the outer end plate 304 are spaced apart by a second distance 324. The second distance 324 is greater than the first distance 320, whereby a second force 326, less than the first force 322, is applied to the grommet 306 by the inner end plate 302 and the outer end plate 304. This second force 326 urges the opening 308 defined by the grommet 306 to have a second size or volume V2 (FIG. 21) greater than the first size or volume V1.

In some examples, the end plate assembly 300 can include an outer plate 328 attached to a side 330 of the grommet 306. The outer plate 328 can include a first attachment member 332 (e.g., a projection), while the outer end plate 304 can include a second attachment member 334 (e.g., a projection). The first attachment member 332 cooperates with the second attachment member 334 to inhibit relative movement between the grommet 306 and the inner end plate 302 and the outer plate 304. Within an example that is shown in FIG. 19, the inner plate 302 includes a complementary attachment member 336 (e.g., a groove) that cooperates with the first attachment member 332. The outer end plate 304 may have a similar complementary attachment member 338 (FIG. 21, e.g., a groove) that cooperates with the second attachment member 334. Once the grommet 306 is positioned in place, as indicated by direction arrowheads 340 (FIG. 22), the grommet 306 may be retained thereat via the first attachment member 332 and the second attachment member 334.

Figure 23:
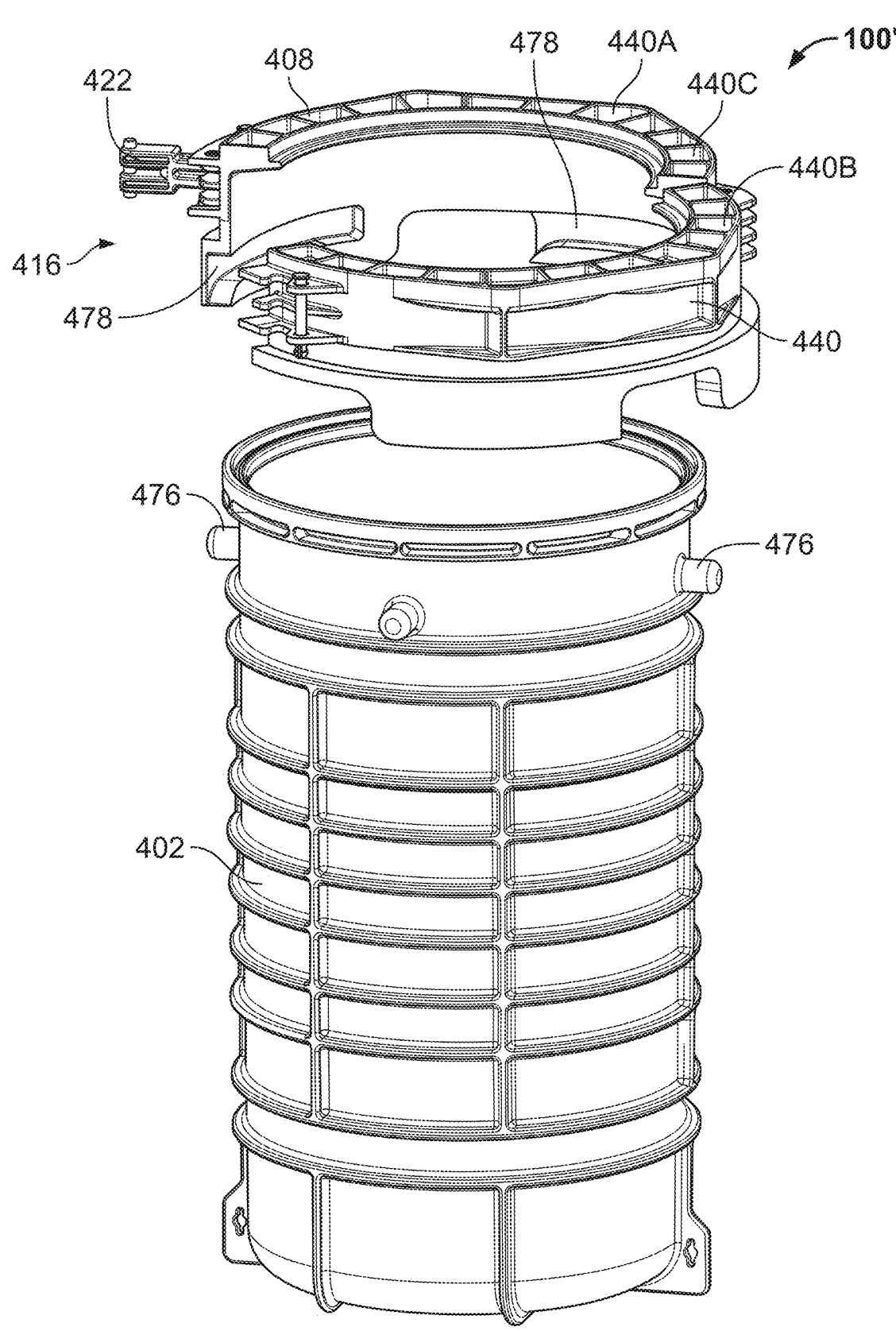
FIG. 23 is an exploded view illustration of another example enclosure with of another example end plate assembly.

FIG. 23 is an exploded view illustration of another example enclosure 100' with of another example end plate assembly 408. For simplicity, the enclosure is referenced with the previously used reference numeral 100, with the additional of a prime (""). It is to be appreciated that the enclosure 100' may have similarities and/or differences to the previously described/shown enclosure 100. The specific structures described following are, of course, different.

Figure 24:
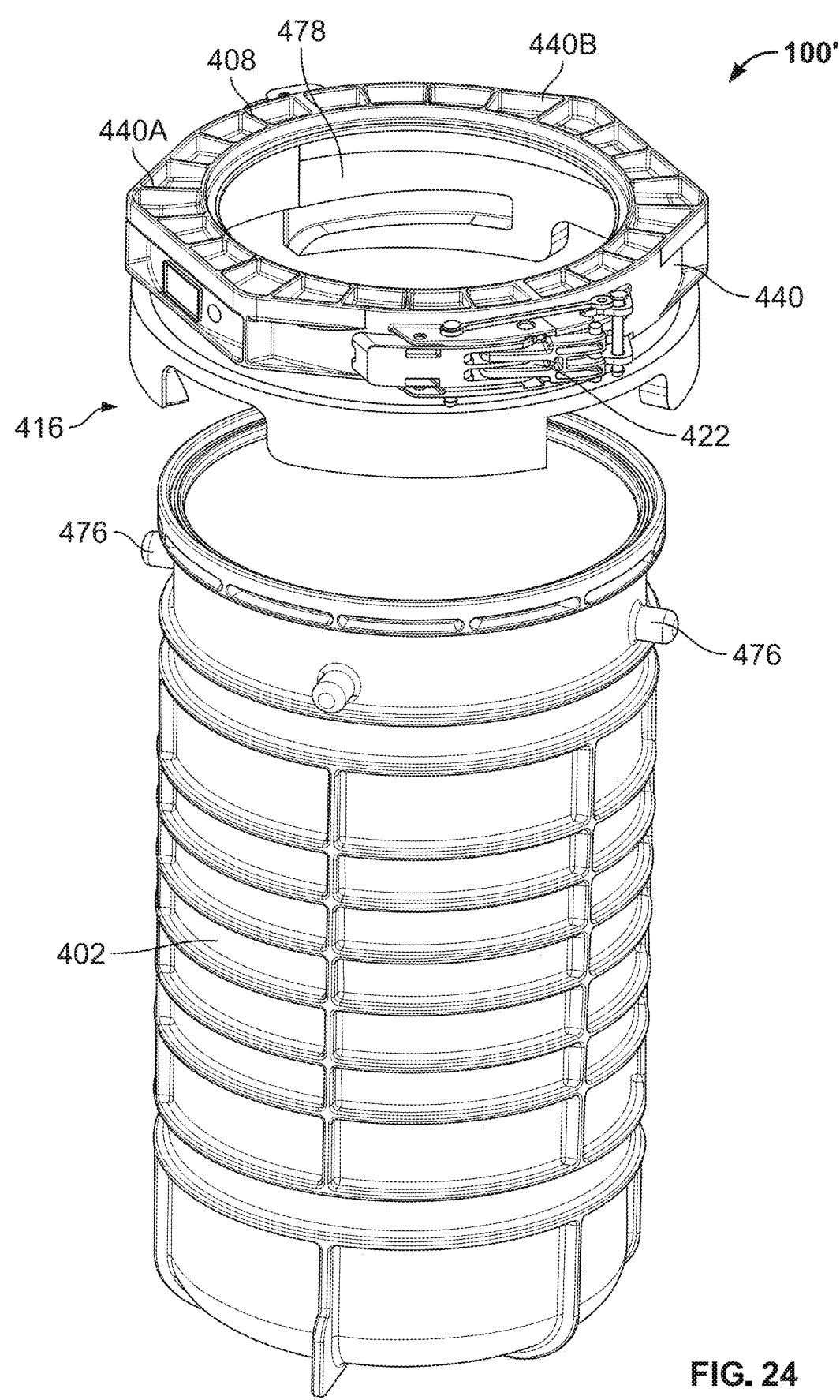
FIG. 24 is a view similar to FIG. 23 and shows an installation step.
Figure 25:
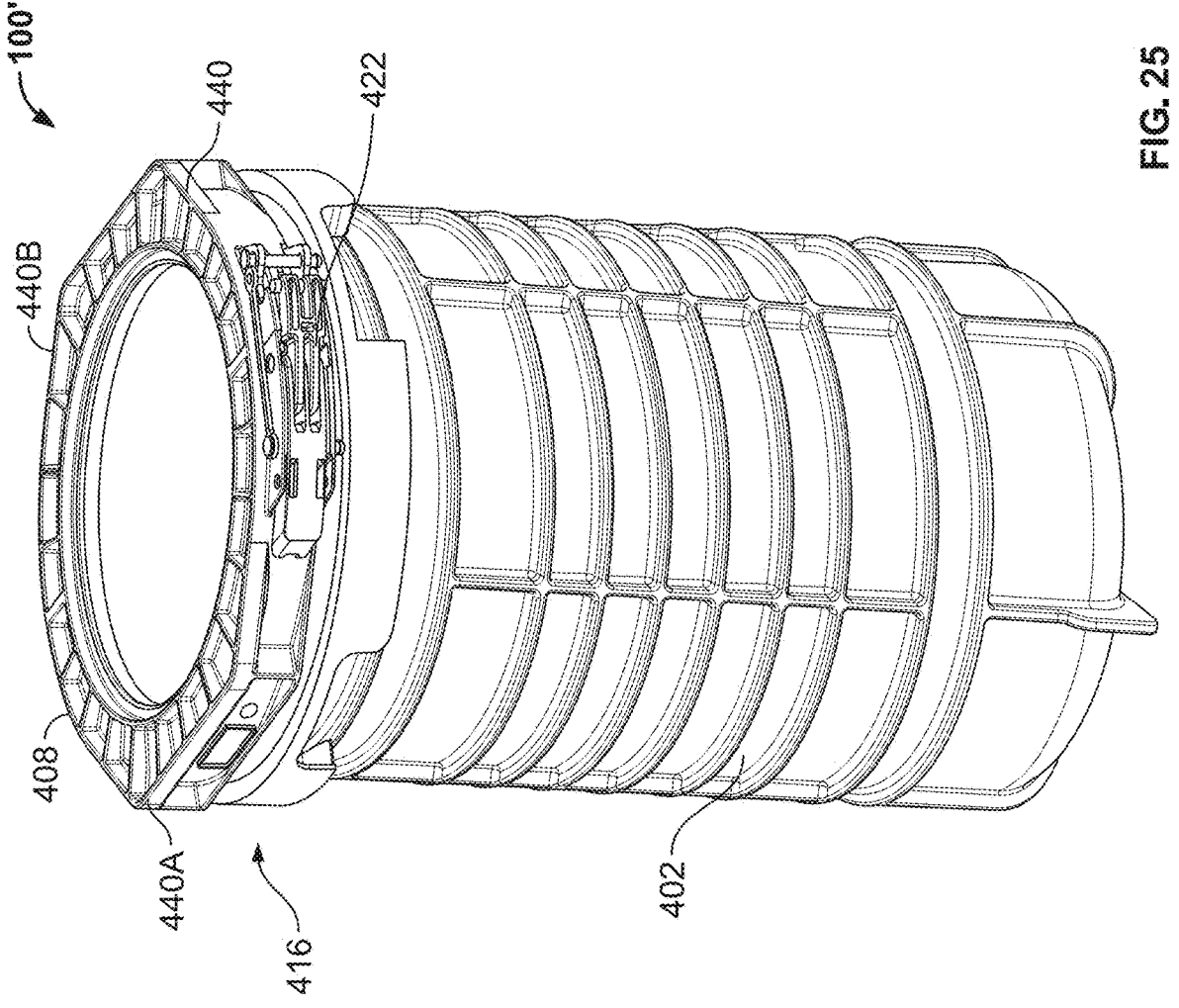
FIG. 25 is a view similar to FIG. 24 and shows a completed installation.

In general, the enclosure 100' (FIGS. 23-25) and associated end plate assembly 408 are configured to provide a different attachment of the end plate assembly 408 to the housing 402. Specifically, a linkage 416 is provided so as to selectively attach the end plate assembly 408 to the housing 402.

A collar 440 of the linkage 416 is provided as two movable semi-circular portions 440A, 440B connected via a hinge 440C. The movable semi-circular portions 440A, 440B may be secured together to form a complete circular shape via a clasp latch 422. See FIGS. 24 and 25 for the clasped condition.

The linkage 416 may include structures to allow the end plate assembly 408 to secure to the housing 402 via relative rotation (i.e., the end plate assembly 408 rotates relative to the housing 402).

Within the shown example, the housing 402 has at least one projection 476 extending laterally outwardly. Within the shown example, the housing 402 has four projections 476 spaced annularly around the housing 402. Of course, a different number of projections 476 are possible and contemplated.

Within the shown example, the collar 440 has at least one helical slot segment 478 located on an inwardly facing segment that faces the housing 402. Within the shown example, the collar 440 has at four helical slot segments 478 spaced annularly within the collar 440. Of course, a different number of helical slot segments 478 are possible and contemplated. Within the example, the number of helical slot segments 478 is equal to the number of projections 476. Within the shown example, each helical slot segment 478 extends such that the end plate assembly 408 may rotate approximately one quarter turn relative to the housing 402.

It is to be appreciated that as the end plate assembly 408 rotates relative to the housing 402, the helix shape of each helical slot segment 478 causes an axial force between the end plate assembly 408 and the housing 402 such that the end plate assembly 408 moves axially relative to/toward the housing 402. Once each projection 476 reach a distal end of the respective helical slot segment 478, a closed and tightened condition is achieved. See FIG. 25 for an example of a closed and tightened condition. Compare the closed and tightened condition of FIG. 25 to the condition shown in FIG. 24 (not closed or tightened).

Figure 26:
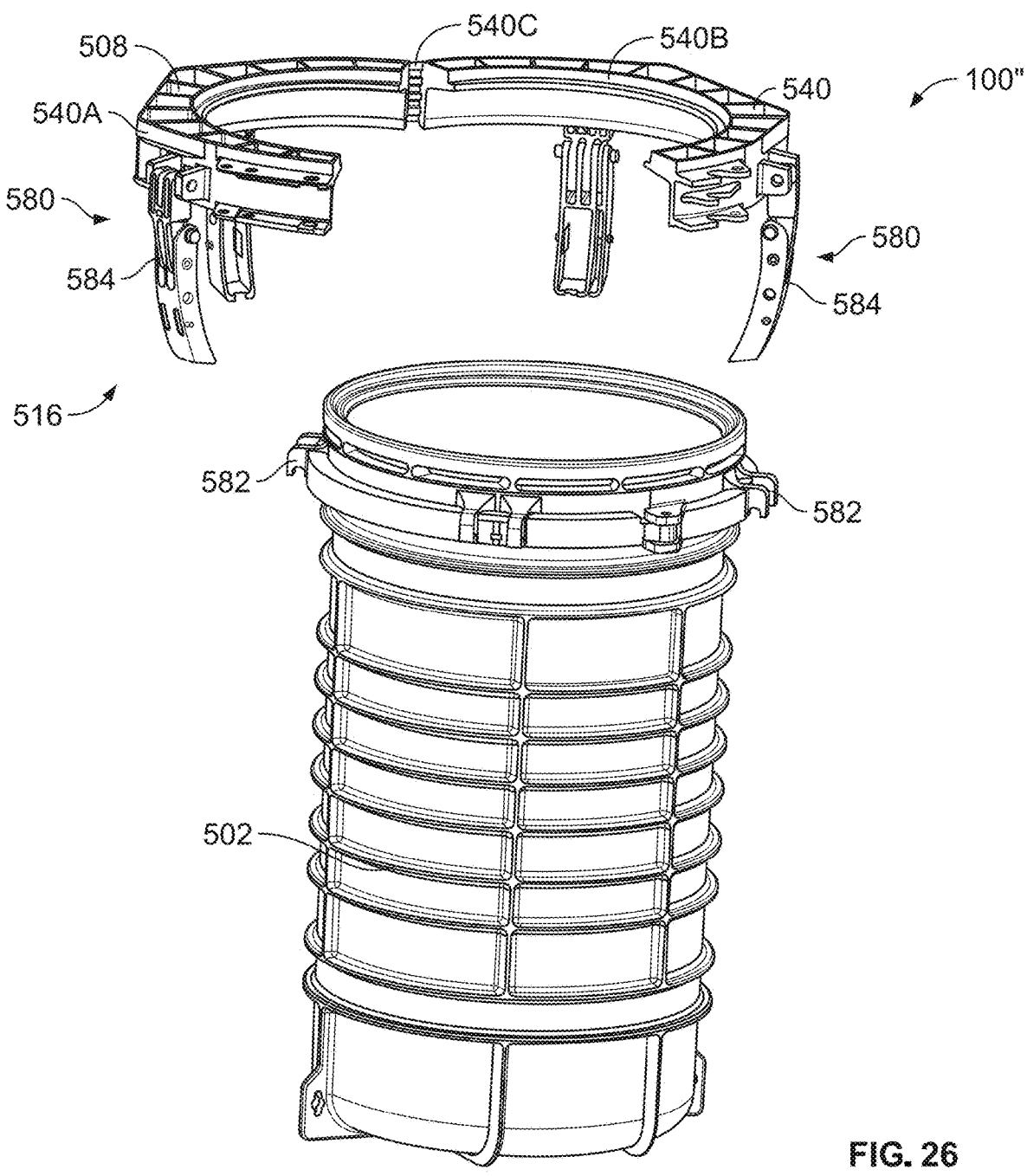
FIG. 26 is an exploded view illustration of another example enclosure with of another example end plate assembly.
Figure 27:
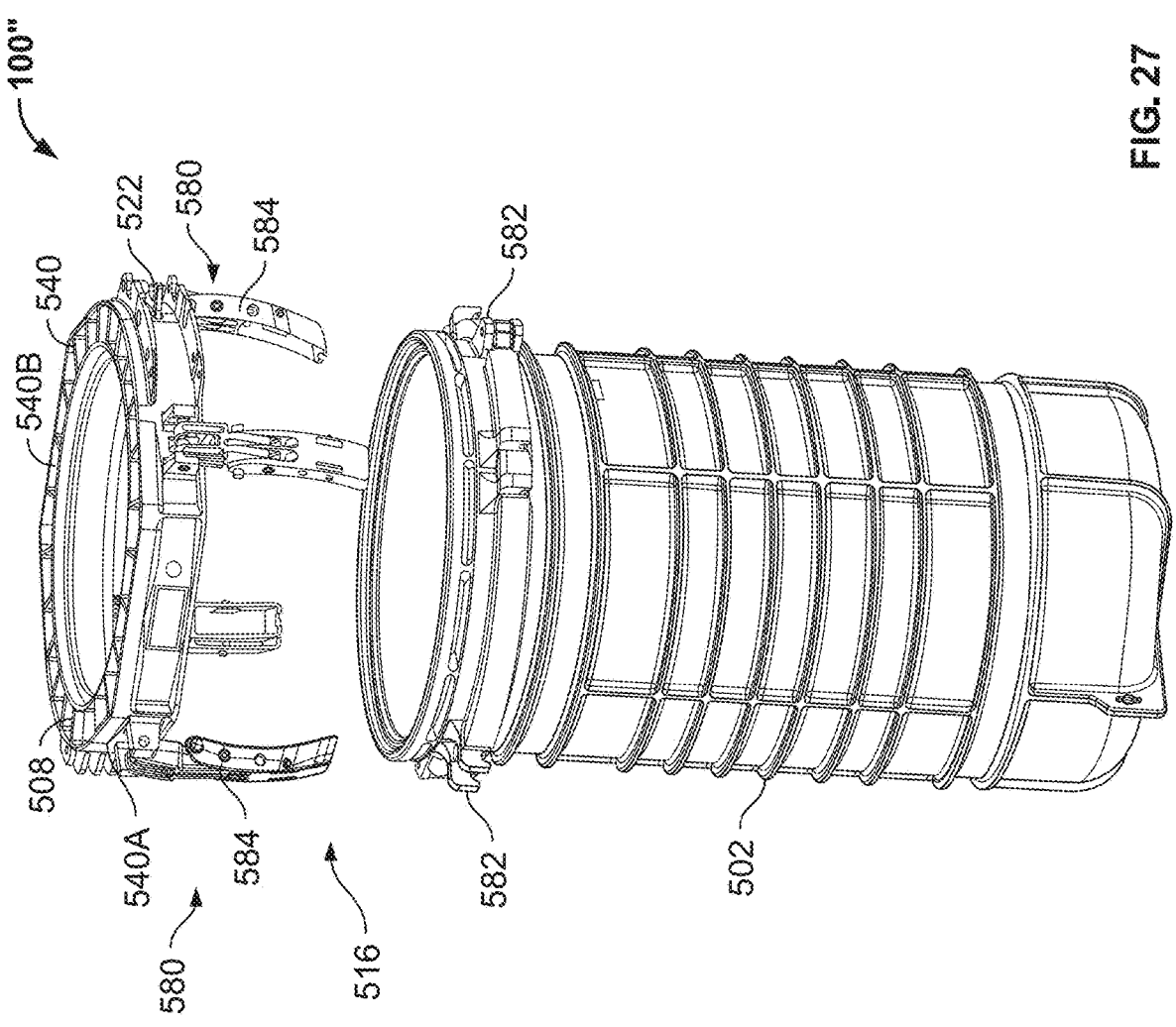
FIG. 27 is a view similar to FIG. 26 and shows an installation step.
Figure 28:
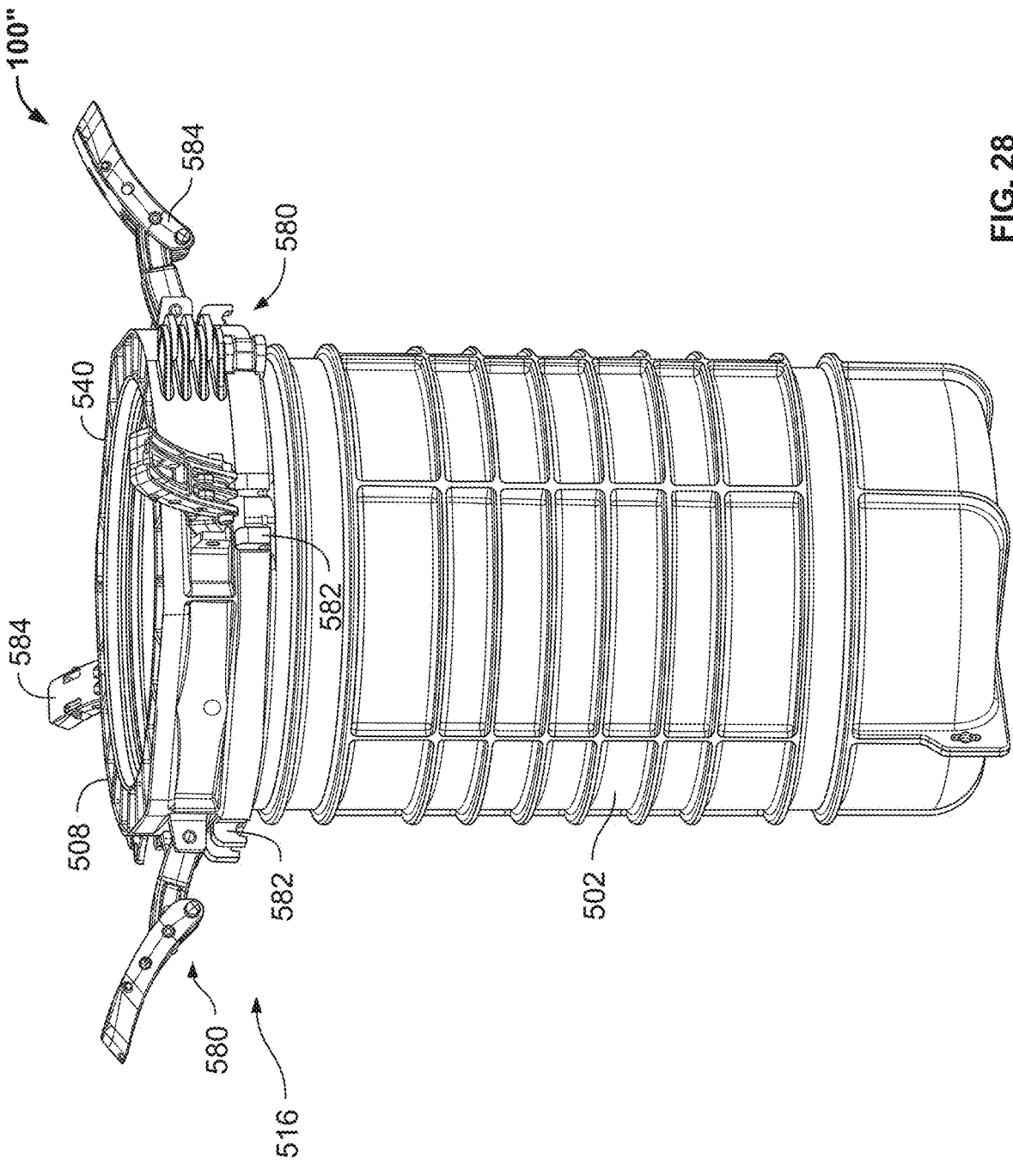
FIG. 28 is a view similar to FIG. 27 and shows an installation step.
Figure 29:
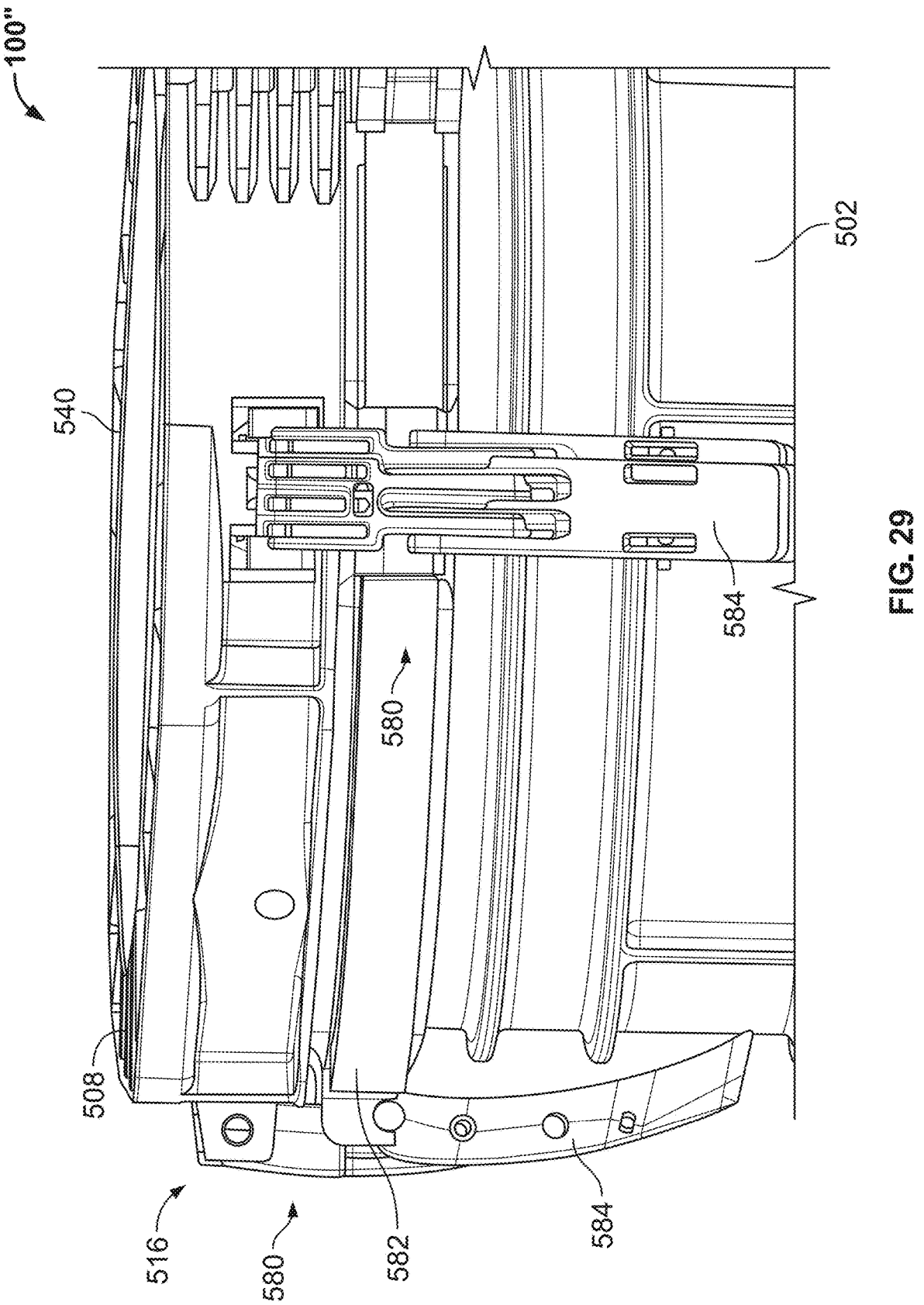
FIG. 29 is an enlarged view of the example of FIGS. 26-28 and shows a completed installation.

FIG. 26 is an exploded view illustration of another example enclosure 100″ with of another example end plate assembly 508. For simplicity, the enclosure referenced with the previously used reference numeral 100, with the additional of a double prime ("″"). It is to be appreciated that the enclosure 100″ may have similarities and/or differences to the previously described/shown enclosure 100. The specific structures described following are, of course, different.

In general, the enclosure 100″ (FIGS. 26-29) and associated end plate assembly 508 are configures to provide a different attachment of the end plate assembly 508 to the housing 502. Specifically, a linkage 516 is provided so as to selectively attach the end plate assembly 508 to the housing 502.

A collar 540 of the linkage 516 is provided as two movable semi-circular portions 540A, 540B connected via a hinge 540C. The movable semi-circular portions 540A, 540B may be secured together to form a complete circular shape via a clasp latch 522. See FIGS. 27-29 for the clasped/completed circle condition.

The linkage 516 may include structures to allow the end plate assembly 508 to secure to the housing 502 via at least one clasp latch arrangement 580.

Within the shown example, there are four clasp latch arrangements 580 annularly around the housing 502. Within the shown example, the clasp latch arrangements 580 spaced annularly around the housing 502. Of course, a different number of clasp latch arrangement 580 are possible and contemplated.

Within the shown example for each clasp latch arrangement 580, a portion to be engaged 582 is located on the housing 502. Within the shown example, the portion to be engaged 582 is an overhang projection 582. Also, within the shown example for each clasp latch arrangement 580, an over-center moveable clasp arrangement 584 is movably attached to the end plate assembly 508. Each clasp arrangement 584 may have plural parts or segments. At least one part or segment of the clasp arrangement 584 may inter-fit under the overhang projection 582 and bear against the overhang projection 582 as the clasp arrangement 584 is actuated (e.g., moved). Such actuation pulls or draws the end plate assembly 508 closed/tight to the housing 502. See FIG. 29 for the closed/tight condition.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cable enclosure comprising:
a housing defining an opening through which an interior of the housing is accessible;
an end plate assembly comprising:
an end plate defining an aperture; and
an end cap receivable within the aperture, such that when the end cap is secured within the aperture and the end plate assembly is attached to the housing, the interior of the housing is not accessible; and
a linkage that selectively attaches the end plate assembly to the housing, the linkage comprising:
a member;
a lever attached to the member; and
a latch attached to the lever at a first attachment point and attached to the end plate assembly at a second attachment point, wherein:
when the lever is in a first position, the first attachment point and the second attachment point are spaced apart a first distance whereby a surface of the member is in contact with a surface of the housing, the end cap is secured within the aperture, and the end plate assembly is attached to the housing such that the interior of the housing is not accessible, and
when the lever is in a second position, the first attachment point and the second attachment point are spaced apart a second distance whereby the surface of the member is not in contact with the surface of the housing, the end cap is not secured within the aperture, and the end plate assembly is not attached to the housing such that the interior of the housing is accessible through at least one of the aperture or the opening.

2. The cable enclosure of claim 1, wherein:
the member comprises a collar,
the housing comprises a cylinder,
an inner diameter of the collar is less than an outer diameter of a flange of the cylinder proximate the opening,
the surface of the member is an upper surface of the collar,
the surface of the housing is a bottom surface of the cylinder, and
when the lever is in the first position, the upper surface of the collar is in contact with the bottom surface of the cylinder.

3. The cable enclosure of claim 1, wherein:
the member comprises a collar,
the housing comprises a cylinder, and
when the lever is in the first position, an upper surface of the collar is in contact with a bottom surface of a protrusion extending from the cylinder away from the interior of the housing.

4. The cable enclosure of claim 1, wherein:
when the lever is in the first position, an upper surface of the member is in contact with a bottom surface of a protrusion extending away from the interior of the housing.

5. The cable enclosure of claim 1, wherein:
when the lever is in the first position, a force applied to the end plate assembly through the latch exceeds a threshold force to attach the end plate assembly to the housing.

6. The cable enclosure of claim 5, wherein:
when the lever is in the second position, the force applied to the end plate assembly through the latch does not exceed the threshold force such that the end plate assembly is not attached to the housing.

7. The cable enclosure of claim 5, wherein:
the housing extends along a housing axis and the force is applied in a direction parallel to the housing axis.

8. The cable enclosure of claim 1, comprising:
a retention mechanism to retain the lever in the first position.

9. The cable enclosure of claim 8, wherein:
the retention mechanism defines a groove dimensioned to receive the lever when the lever is in the first position.

10. The cable enclosure of claim 1, wherein:
the member travels in a first direction toward the end plate assembly when the lever is moved from the second position to the first position to attach the end plate assembly to the housing,
the housing comprises a first protrusion extending away from the interior of the housing,
the member comprises a second protrusion extending toward the interior of the housing, and
the second protrusion interferes with the first protrusion to limit an amount of travel of the member in a second direction away from the end plate assembly.

11. The cable enclosure of claim 10, wherein:
the second protrusion does not limit an amount of travel of the member in the first direction.

12. A cable enclosure comprising:
a housing defining an opening through which an interior of the housing is accessible;
an end plate assembly that, when attached to the housing, covers the opening such that the interior of the housing is not accessible; and a linkage attached to at least one of the housing or the end plate assembly and that selectively attaches the end plate assembly to the housing, wherein:
when the linkage is in a first position, the end plate assembly is attached to the housing,
when the linkage is in a second position, the end plate assembly is not attached to the housing,
the linkage travels in a first direction when moved from the second position to the first position to attach the end plate assembly to the housing,
the housing comprises a first protrusion extending away from the interior of the housing,
the linkage comprises a second protrusion extending toward the interior of the housing,
the second protrusion interferes with the first protrusion to limit an amount of travel of the linkage in a second direction opposite the first direction, and
the second protrusion does not limit an amount of travel of the linkage in the first direction.

13. The cable enclosure of claim 12, wherein:
the opening, as defined by the housing, is substantially circular.

14. The cable enclosure of claim 13, wherein:
the end plate assembly is substantially circular to cover the opening.

15. The cable enclosure of claim 12, wherein:
the housing extends along a housing axis and the first direction is parallel to the housing axis.

16. A linkage that selectively attaches an end plate assembly of a cable enclosure to a housing of the cable enclosure, the linkage comprising:
a member;
a lever attached to the member; and
a latch attached to the lever at a first attachment point and for attachment to the end plate assembly at a second attachment point, wherein:
when the lever is in a first position, the first attachment point and the second attachment point are spaced apart a first distance whereby a surface of the member is in contact with a surface of the housing and the end plate assembly is attached to the housing, and
when the lever is in a second position, the first attachment point and the second attachment point are spaced apart a second distance whereby the surface of the member is not in contact with the surface of the housing and the end plate assembly is not attached to the housing.

17. The linkage of claim 16, comprising:
a retention mechanism to retain the lever in the first position.

18. The linkage of claim 17, wherein:
the retention mechanism defines a groove dimensioned to receive the lever when the lever is in the first position.

19. An end plate assembly comprising:
an end plate that, when attached to a housing, covers an opening in the housing such that an interior of the housing is not accessible through the opening, the end plate comprising:
a grommet defining an opening for a cable passing into the interior of the housing; and
a retainer, and
an end cap comprising:
a body; and
a lever movable between a first position and a second position relative to the body,
wherein:

when the lever is in the first position, the lever cooperates with the retainer to locate the body a first distance from the grommet such that a first force is applied to the grommet by the body causing the opening defined by the grommet to have a first size, and when the lever is in the second position, the lever cooperates with the retainer to locate the body a second distance, greater than the first distance, from the grommet such that a second force, less than the first force, is applied to the grommet by the body causing the opening defined by the grommet to have a second size greater than the first size.

20. An end plate assembly comprising:

an inner end plate;

an outer end plate;

a grommet located between the inner end plate and the outer end plate, the grommet defining an opening for a cable passing through the end plate assembly;

a fastener cooperating with the inner end plate and the outer end plate; and a lever attached to the fastener, the lever movable between a first position and a second position relative to the fastener, wherein:

when the lever is in the first position, the lever cooperates with the fastener such that the inner end plate and the outer end plate are spaced apart a first distance whereby a first force is applied to the grommet by the inner end plate and the outer end plate causing the opening defined by the grommet to have a first size, and when the lever is in the second position, the lever cooperates with the fastener such that the inner end plate and the outer end plate are spaced apart by a second distance, greater than the first distance, whereby a second force, less than the first force, is applied to the grommet by the inner end plate and the outer end plate causing the opening defined by the grommet to have a second size greater than the first size.

21. The end plate assembly of claim 20, comprising:

an outer plate attached to a side of the grommet, wherein:

the outer plate comprises a first attachment member, the outer end plate comprises a second attachment member, and the first attachment member cooperates with the second attachment member to inhibit relative movement between the grommet and the inner end plate.

\* \* \* \* \*